(12) United States Patent
Newell et al.

(10) Patent No.: US 11,196,826 B2
(45) Date of Patent: Dec. 7, 2021

(54) COMMUNICATIONS CHANNELS IN MEDIA SYSTEMS

(71) Applicant: Dish Technologies L.L.C., Englewood, CO (US)

(72) Inventors: Nicholas Brandon Newell, Centennial, CO (US); Christopher Day, Denver, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 196 days.

(21) Appl. No.: 15/389,694

(22) Filed: Dec. 23, 2016

(65) Prior Publication Data
US 2018/0183885 A1    Jun. 28, 2018

(51) Int. Cl.
| | |
|---|---|
| G06F 15/16 | (2006.01) |
| G06F 9/54 | (2006.01) |
| H04L 29/06 | (2006.01) |
| H04L 29/08 | (2006.01) |
| G10L 15/02 | (2006.01) |
| G10L 15/30 | (2013.01) |
| G10L 25/63 | (2013.01) |

(52) U.S. Cl.
CPC ............ *H04L 67/22* (2013.01); *G10L 15/02* (2013.01); *G10L 15/30* (2013.01); *H04L 67/12* (2013.01); *G10L 25/63* (2013.01); *H04L 67/306* (2013.01)

(58) Field of Classification Search
CPC ...................................................... H04L 67/22
USPC ........................................................ 709/223
See application file for complete search history.

(56) References Cited

U.S. PATENT DOCUMENTS

| | | |
|---|---|---|
| 4,870,579 A | 9/1989 | Hey |
| 6,205,427 B1 | 3/2001 | Itoh et al. |
| 6,321,221 B1 | 11/2001 | Bieganski |
| 6,774,926 B1 | 8/2004 | Ellis et al. |
| 6,978,470 B2 | 12/2005 | Swix |
| 7,958,525 B2 | 6/2011 | Karaoguz et al. |
| 8,180,804 B1 | 5/2012 | Narayanan et al. |
| 8,195,460 B2 | 6/2012 | Degani et al. |
| 8,327,395 B2 | 12/2012 | Lee et al. |
| 8,332,883 B2 | 12/2012 | Lee et al. |
| 8,561,095 B2 | 10/2013 | Dimitrova et al. |
| 8,589,968 B2 | 11/2013 | Alberth et al. |
| 8,654,952 B2 | 2/2014 | Wang et al. |
| 8,676,875 B1 | 3/2014 | Smith et al. |
| 8,682,666 B2 | 3/2014 | Degani et al. |

(Continued)

FOREIGN PATENT DOCUMENTS

CN          104038836 A    9/2014

OTHER PUBLICATIONS

Final Office Action dated May 1, 2018 for U.S. Appl. No. 15/378,950 (58 pages).

(Continued)

*Primary Examiner* — Hamza N Algibhah
(74) *Attorney, Agent, or Firm* — Perkins Cole LLP

(57) ABSTRACT

A computing device is programmed to receive, first and second user indicia of interest for media content. The computing device is further programmed to receive first user data related to a media content item. Based at least in part on the first and second user indicia of interest and the first user data, the computing device is further programmed to generate output that the first user recommend the media content item to the second user.

20 Claims, 7 Drawing Sheets

(56) References Cited

U.S. PATENT DOCUMENTS

| | | | |
|---|---|---|---|
| 8,694,495 B2* | 4/2014 | Saito | G06F 16/284 |
| | | | 707/732 |
| 8,768,744 B2 | 7/2014 | Narasimhan et al. | |
| 8,782,681 B2 | 7/2014 | Lee et al. | |
| 8,849,199 B2 | 9/2014 | Shrum, Jr. et al. | |
| 8,849,649 B2 | 9/2014 | Duong-van | |
| 8,930,977 B1 | 1/2015 | Swift | |
| 8,973,022 B2 | 3/2015 | Lee et al. | |
| 9,009,024 B2 | 4/2015 | Zhang et al. | |
| 9,026,476 B2 | 5/2015 | Bist | |
| 9,213,705 B1 | 12/2015 | Story, Jr. et al. | |
| 9,306,989 B1 | 4/2016 | Jayaram | |
| 9,338,493 B2 | 5/2016 | Van Os et al. | |
| 9,454,519 B1 | 9/2016 | Keysers et al. | |
| 9,679,570 B1 | 6/2017 | Edara | |
| 9,712,587 B1 | 7/2017 | Alfishawai et al. | |
| 9,832,619 B2* | 11/2017 | Cho | G06Q 10/00 |
| 2003/0063222 A1 | 4/2003 | Creed et al. | |
| 2003/0195863 A1 | 10/2003 | Marsh | |
| 2004/0001616 A1 | 1/2004 | Gutta | |
| 2005/0132401 A1 | 6/2005 | Boccon-Gibod et al. | |
| 2005/0144064 A1 | 6/2005 | Calabria et al. | |
| 2006/0159109 A1 | 7/2006 | Lamkin | |
| 2007/0288987 A1 | 12/2007 | Kim et al. | |
| 2008/0046917 A1 | 2/2008 | de Heer | |
| 2009/0030792 A1 | 1/2009 | Khivesara et al. | |
| 2009/0144071 A1* | 6/2009 | Saito | G06Q 30/0281 |
| | | | 705/346 |
| 2009/0144075 A1 | 6/2009 | Flinn et al. | |
| 2009/0234727 A1* | 9/2009 | Petty | G06F 17/30306 |
| | | | 705/14.54 |
| 2010/0114937 A1 | 5/2010 | Hawthorne et al. | |
| 2010/0138416 A1 | 6/2010 | Bellotti | |
| 2010/0273453 A1* | 10/2010 | Mikan | H04M 1/656 |
| | | | 455/412.1 |
| 2010/0324992 A1 | 12/2010 | Birch | |
| 2011/0238495 A1 | 9/2011 | Kang | |
| 2011/0282947 A1 | 11/2011 | Dodson | |
| 2011/0320471 A1* | 12/2011 | Hiroi | H04N 21/4755 |
| | | | 707/767 |
| 2012/0005224 A1 | 1/2012 | Ahrens | |
| 2012/0266191 A1 | 10/2012 | Abrahamsson et al. | |
| 2012/0311618 A1 | 12/2012 | Blaxland | |
| 2013/0145385 A1 | 6/2013 | Aghajanyan et al. | |
| 2013/0297638 A1 | 11/2013 | Hein | |
| 2013/0339105 A1* | 12/2013 | Russell | G09B 19/04 |
| | | | 705/7.42 |
| 2014/0036022 A1 | 2/2014 | Groen et al. | |
| 2014/0067953 A1 | 3/2014 | Weinstein | |
| 2014/0088952 A1* | 3/2014 | Fife | G06F 17/27 |
| | | | 704/9 |
| 2014/0089801 A1 | 3/2014 | Agrawal | |
| 2014/0108142 A1 | 4/2014 | Toebes et al. | |
| 2014/0173653 A1 | 6/2014 | Waibel et al. | |
| 2014/0188997 A1 | 7/2014 | Schneiderman et al. | |
| 2014/0195328 A1 | 7/2014 | Ferens et al. | |
| 2014/0201125 A1 | 7/2014 | Moeinifar et al. | |
| 2014/0229208 A1* | 8/2014 | Tamayo | G06Q 10/10 |
| | | | 705/5 |
| 2014/0244636 A1 | 8/2014 | Mickelsen | |
| 2014/0279751 A1 | 9/2014 | Ram et al. | |
| 2014/0298364 A1 | 10/2014 | Stepanov et al. | |
| 2014/0337427 A1* | 11/2014 | Hamada | H04L 29/06 |
| | | | 709/204 |
| 2014/0344039 A1 | 11/2014 | Kowalczyk | |
| 2014/0365349 A1 | 12/2014 | Kennon | |
| 2015/0020086 A1* | 1/2015 | Chen | H04N 21/44008 |
| | | | 725/12 |
| 2015/0026706 A1 | 1/2015 | Leamon | |
| 2015/0039549 A1* | 2/2015 | Aufmann | G06F 17/3053 |
| | | | 706/46 |
| 2015/0081851 A1 | 3/2015 | Oyman et al. | |
| 2015/0112918 A1* | 4/2015 | Zheng | G06Q 30/02 |
| | | | 706/48 |
| 2015/0154960 A1 | 6/2015 | Ai et al. | |
| 2015/0294221 A1* | 10/2015 | Andres Gutierrez | |
| | | | G06Q 30/0261 |
| | | | 706/46 |
| 2015/0302059 A1* | 10/2015 | Lee | G06F 16/24564 |
| | | | 707/736 |
| 2016/0029057 A1* | 1/2016 | Wickenkamp | H04N 21/252 |
| | | | 725/14 |
| 2016/0034970 A1* | 2/2016 | Musil | G06Q 30/0269 |
| | | | 705/14.66 |
| 2016/0119757 A1* | 4/2016 | Zhang | H04W 4/029 |
| | | | 455/456.3 |
| 2016/0125419 A1* | 5/2016 | Arslan | G06Q 30/016 |
| | | | 705/304 |
| 2016/0147767 A1* | 5/2016 | Manning | G06F 17/30864 |
| | | | 715/716 |
| 2016/0189562 A1* | 6/2016 | Vaughan | G09B 19/00 |
| | | | 434/308 |
| 2016/0239547 A1* | 8/2016 | Lim | G06F 3/04842 |
| 2016/0255163 A1* | 9/2016 | Stathacopoulos | H04L 67/22 |
| | | | 709/227 |
| 2016/0259797 A1 | 9/2016 | Lewis et al. | |
| 2016/0277787 A1 | 9/2016 | Kobayashi et al. | |
| 2016/0291921 A1 | 10/2016 | Miller et al. | |
| 2016/0352902 A1* | 12/2016 | Raanani | G10L 17/02 |
| 2017/0048184 A1* | 2/2017 | Lewis | H04L 51/10 |
| 2017/0134803 A1 | 5/2017 | Shaw | |
| 2017/0169726 A1 | 6/2017 | Aguirre | |
| 2017/0220570 A1* | 8/2017 | Tilaye | H04N 21/44218 |
| 2017/0228774 A1* | 8/2017 | Sallas | G06F 16/9535 |
| 2017/0322947 A1 | 11/2017 | Subramanian | |
| 2017/0324697 A1* | 11/2017 | Bastide | H04L 51/24 |
| 2017/0339467 A1* | 11/2017 | Patel | H04N 21/4826 |
| 2017/0364854 A1* | 12/2017 | Umematsu | G06Q 30/01 |
| 2017/0366861 A1* | 12/2017 | Chung | H04N 21/431 |
| 2018/0040019 A1* | 2/2018 | Gavlovski | G06Q 30/0255 |

OTHER PUBLICATIONS

Non-Final Office Action dated Jun. 13, 2018 for U.S. Appl. No. 15/145,060 (40 pages).

Non-Final Office Action dated Feb. 2, 2018 for U.S. Appl. No. 15/008,543 (36 pages).

Non-Final Office Action dated Jul. 13, 2018 for U.S. Appl. No. 15/389,718 (57 pages).

Non-Final Office Action dated Aug. 24, 2018 for U.S. Appl. No. 15/389,730 (60 pages).

Non-Final Office Action dated Mar. 27, 2018 for U.S. Appl. No. 15/008,540 (34 pages).

Non-Final Office Action dated Nov. 17, 2017 for U.S. Appl. No. 15/378,950 (53 pages).

Notice of Allowance dated Aug. 26, 2016 in U.S. Appl. No. 14/802,842 (26 pages).

Non-Final Office Action dated Feb. 8, 2017 in U.S. Appl. No. 15/289,585 (16 pages).

Notice of Allowance dated Jun. 6, 2017 in U.S. Appl. No. 15/289,585 (11 pages).

Final Office Action dated Nov. 2, 2018 for U.S. Appl. No. 15/008,540 (68 pages).

Sato et al., "Recommender System By Grasping Individual Preference and Influence from other users," 2013 IEEE/ACM International Conference on Advances in Social Networks Analysis and Mining (ASONAM'13), ACM, 2013, pp. 1345-1351.

Kompan et al., "Context-based Satisfaction Modelling for Personalized Recommendations," 8th International Workshop on Semantic and Social Media Adaptation and Personalization, IEEE, 2013, pp. 33-38.

Bublitz et al., "Using Statistical Data for Context Sensitive Pervasive Advertising," IEEE, 2014, pp. 41-44.

Hong et al., "A Comparative Study of Video Recommender Systems in Big Data Era," IEEE, 2016, pp. 125-127.

Miao et al., "Multirelational Social Recommendations via Multigraph Ranking," IEEE, 2016, pp. 1-13.

Final Office Action dated Feb. 21, 2019 for U.S. Appl. No. 15/145,060.

(56) References Cited

OTHER PUBLICATIONS

Final Office Action dated Feb. 21, 2019 for U.S. Appl. No. 15/389,730.
Final Office Action dated Feb. 8, 2019 for U.S. Appl. No. 15/389,718.
Advisory Action dated Jan. 24, 2019 for U.S. Appl. No. 15/008,540.
Notice of Allowance dated Dec. 11, 2018 for U.S. Appl. No. 15/008,543.
Notice of Allowance dated Apr. 10, 2019 for U.S. Appl. No. 15/389,718.

* cited by examiner

COMMUNICATIONS CHANNELS IN MEDIA SYSTEMS

BACKGROUND

Existing media systems provide media content to users by streaming the data to user devices such as mobile telephones and laptops, and media devices such as set-top boxes, gaming consoles, televisions, etc. To assist users to select media content, it may be desirable for a media system to identify, based on data related to users, media content items that are likely to be of interest to the user, and to present them to the user, via user interfaces such as graphical user interfaces on the user and media devices. Challenges exist in addressing these issues, e.g, in generating communications channels between devices within the media system based on user related data.

DRAWINGS

DETAILED DESCRIPTION

Exemplary System

A central computer system collects user data related to users of media content items. The user data includes data related to media content usage, user communications related to media content, user feedback related to media content, user response data during the viewing of a media content item, etc. The user data further includes other data related to the user, such as demographic data, situation data, etc. The computer system collects user data in a variety of ways. For example, the computer system may collect data by requesting the data from the user, by monitoring the user via sensors, by parsing user communications, etc.

Based on the user data, the computer system initiates interactions between media content customer systems, sometimes referred to as user-user interactions, related to media content items. Further, based on the data, the computer system identifies correlations between user-user communications and subsequent media usage. The correlations are ranked based on a level of correlation. A high level of correlation indicates that a first user may have decided to view a media content item at least in part due to the communication. Similarly, a high level of correlation indicates that the first user may have decided to view the media content item at least in part due to another participant in the communication.

Figure 1:
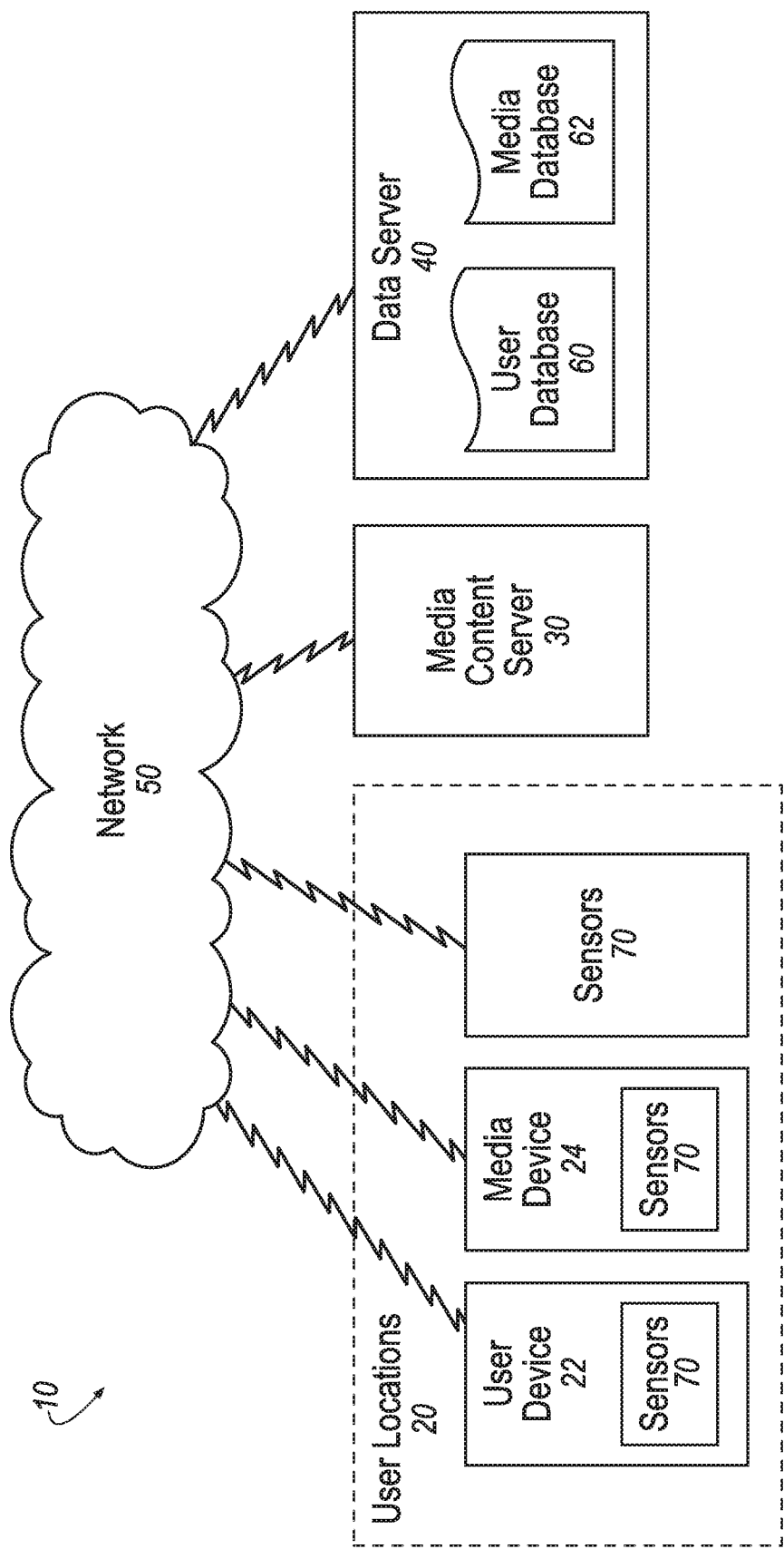
FIG. 1 is a diagram of an exemplary media system for providing media content items.

As shown in FIG. 1, an exemplary computer system 10 includes one or more user devices 22, one or more media devices 24, a media content server 30, a data server 40 and a network 50. The one or more user devices 22 and one or more media devices 24 may be included in respective user locations 20.

Each of the user devices 22, media devices 24, media content server 30, and data server 40 are communicatively coupled via the network 50.

The computer system 10 further includes one or more sensors 70. The sensors 70 may be independent computing devices with sensing elements, communicatively coupled within the computer system 10 via the network 50. Additionally or alternatively, the sensors 70 may be included in the one or more user devices 22 and media devices 24. In this case, the sensors 70 may be communicatively coupled within the system 10 via the associated user device 22 or media device 24.

The sensors 70 are programmed to collect data related to the user. Non-limiting examples of sensors 70 include microphones, cameras, biometric sensors (heart rate, blood pressure, etc.), movement sensors such as accelerometers and gyroscopes, temperature sensors, location sensors (e.g., a global positioning system), etc. The sensors 70 collect data such as user movements, user verbal communications, user facial expressions, user location, user biometric data, etc. The sensors 70 provide the user data to the data server 40.

The user device 22 may be a known computing device such as a mobile telephone, tablet, smart wearable (smart watch, fitness band, etc.), other computing device, etc. The user device 22 includes one or more processors and one or more memories, and may include sensors 70 for collecting user data. The user device 22 may further include one or more user applications such as email, a calendar, web browser, social media interfaces, etc. The user device 22 is programmed to collect data from the sensors 70 and/or from the user applications and provide the data to the data server 40. The user device 22 may further be programmed to receive media content and display the media content to the user. The term "media content" as used herein, refers to audio and/or video data, e.g., in a format such as described below. The media content may be received, for example, from the media content server 30.

The media device 24 receives and displays media content, and is typically a known computing device including one or more processors and one or more memories. Non-limiting examples of a media device include a set-top box, a laptop, desktop, tablet computer, game box, a television, a smart television, etc.

As with the user device 22, the media device 24 may include one or more sensors 70 for collecting user data. The media device 24 may be programmed to collect data from the sensors 70 and provide the data to the data server 40. Further, the media device 24 may be programmed to collect user data such as media content usage data and provide the data to the data server 40. For example, the media device 24 may detect which channel and/or media content item a user is viewing, detect when the user changes channels, fast forwards through media content, rewinds media content to review, etc., and can provide this data to the data server 40.

The system 10 is described as including both user devices 22 and media devices 24. However, the operations of displaying media content to a user, collecting data related to the user and communicating with the user can be performed by either or both of these devices 22, 24. The system 10 only requires that a user be associated with at least one of a user device 22 and media device 24 capable of performing these operations.

The media content server 30 may be, for example, a known computing device included in one or more of a cable or satellite television headend, a video streaming service such as generally includes a multimedia web server (or some other computing device), etc. The media server 30 may provide media content, e.g., a movie, live event, audio, to the user devices 22 and/or media devices 24.

The media content is typically delivered as compressed audio and/or video data. For example, the data may be formatted according to known standards such as MPEG or H.264. MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content may be provided to a media device 13 in a format such as the MPEG-1, MPEG-2 or the H.264/MPEG-4 Advanced Video Coating standards (AVC) (H.264 and MPEG-4 at present being consistent) and HEVC/H.265. As is known, MPEG and H.264 data include metadata, audio, and video components. Further, media content and advertisement content in the media system 10 could alternatively or additionally be provided according to some other standard or standards. For example, media content and advertisement content could be audio data formatted according to standards such as MPEG-2 Audio Layer III (MP3), Advanced Audio Coding (AAC), etc.

The data server 40 may be a known computing device including one or more processors and one or more memories. As described in detail below, the data server 40 is programmed to collect and store user data in a user database 60. The user data includes data related to usage and preferences of media content items, and further includes other data such as user demographic data, user situational data, user relationship data, etc. User data may specifically include keywords indicating user preferences related to media content and the viewing experience. Keywords will be discussed in additional detail below.

The data server 40 is further programmed to collect data related to media content items and store the data in a media content database 62. Media content data includes descriptive data such as type of media content item, actors associated with the media content items, soundtrack composers associated with the media content item, etc. Media content data 62 further includes user data related to the media content item such as ratings of the media content items, keywords associated with the media content item by the users, trend data such as quantity of communications related to the media content item, etc.

The network 50 represents one or more mechanisms for providing communications, including the transfer of media content items, between the user devices 22, the media devices 24, the media server 30, the data server 40 and the sensors 70. Accordingly, the network 50 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) and/or wide area networks (WAN), including the Internet, etc.

As discussed above, user devices 22 and media devices 24 may include sensors 70. The sensors 70 collect user data, and provide the user data to the data server 40 via the network 50.

For example, a microphone in the user device 22 may listen, on a substantially continuous basis, to the surroundings, and record user conversations and other received sounds and provide audio data to the data server 40. As another example, the sensors 70 may collect biometric data related to the user, such as the user's blood pressure, heartrate or body temperature.

Example Processes

Figure 2:
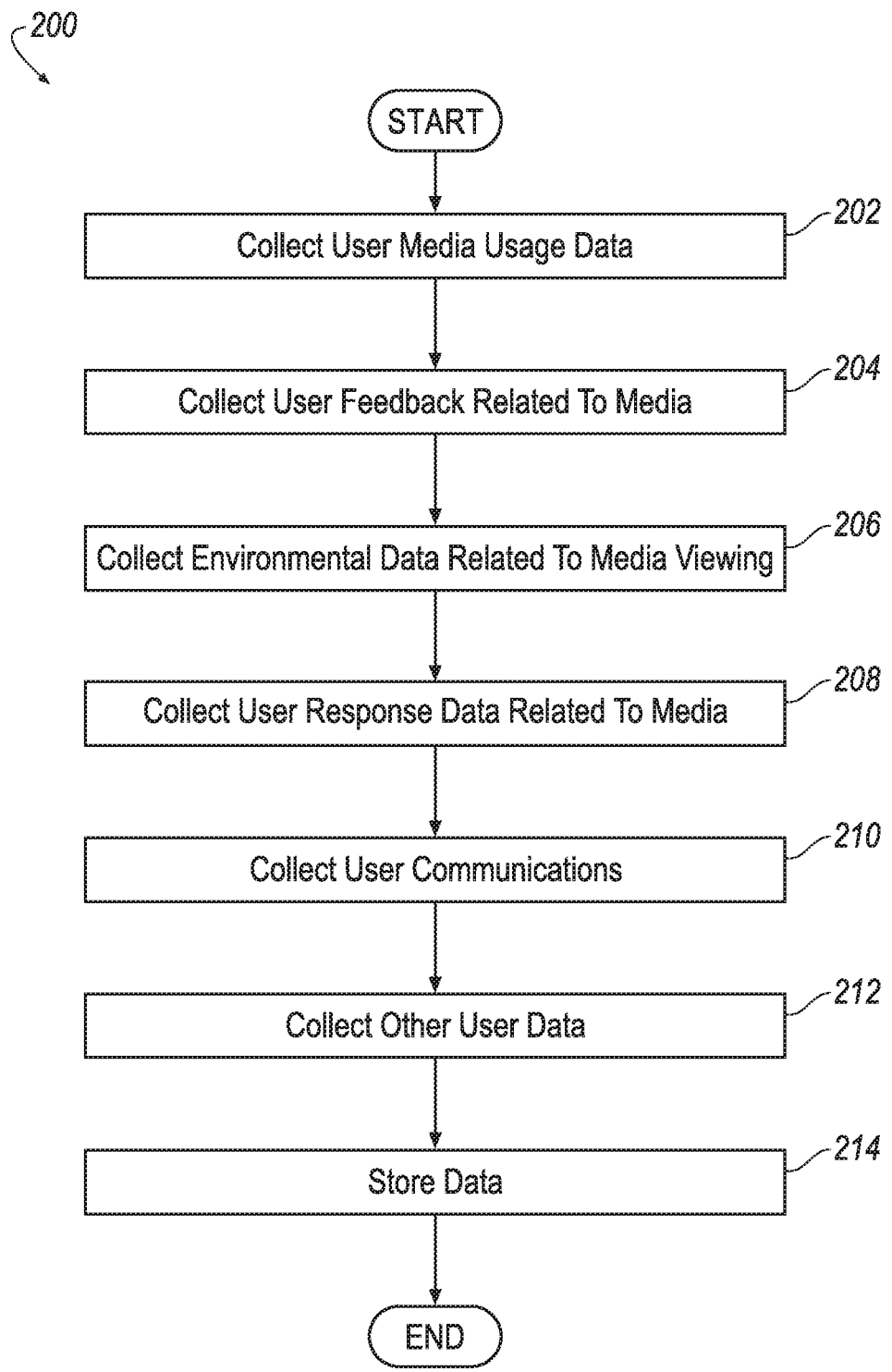
FIG. 2 is a diagram of an exemplary process for collecting and storing data and related to media content.

FIG. 2 is diagram of an exemplary process 200 collecting and storing data related to users of media content. The process 200 starts in a block 202.

In the block 202, the data server 40 collects media usage data with regard to one or more users of media content. Usage data is data related to a user's media viewing behavior, and includes data related to the user's viewing of media content. Examples of usage data include the media content items viewed by the user, when the user viewed the respective media content items, the type of device the user used to view the media content items, and other data indicating user media content usage. Examples of usage data further include actions taken by the user during the viewing of the media content item such as rewinding the media content to review a segment, fast forwarding the media content item to skip a segment, channel surfing during the viewing of a media content item, choosing to record the media content item while viewing it, etc.

The data server 40 may receive the usage data from one or both of the user device 22 and the media device 24. For example, the user may view a media content item on the media device 24. While viewing the media content item, the user may, via a remote control device, fast-forward through one or more segments of the media content item. The media device 24 may provide data to the data server 40 identify segments of the media content item that the user skipped. As another example, the user may view a media content item such as a streamed movie on the user device 22. The user may, after watching a few minutes of the movie, turn off the movie. The user device 22 may provide data to the data server 40 indicating that the user discontinued the movie and further provide data indicating how long the user watched the movie before turning it off.

Upon collecting the user media usage data, the process 200 continues in a block 204. Note that although the process 200 is described as a sequential series of data collection steps, one or more of these data collection steps may take place at the same time. Additionally, the order of performing the different collection steps may be adjusted.

In the block 204, the data server 40 collects user feedback related to media content items. User feedback is data related to a media content item or media content view experience provided explicitly by the user and includes data such as reviews provided by the user and ratings provided by the user. For example, upon determining that the user has completed viewing a media content item, the data server 40 may request the user to provide feedback. The user may, based on the response (or without a prompt), for example, record a video related to the media content item via a user device 22. The user device 22 may provide the user feedback to the data server 40.

As another example, the server 40 may request, via a graphical user interface (GUI) on the user device 22, that the user provide a rating for the media content item. The user may input a score such as one out of five. Additionally, via the GUI, the user may provide a comment such as, "that movie was really boring. I only watched it because I was stuck in an airport." The user device 22 may provide the rating and/or comment to the data server 40. Upon collecting the user feedback, the process 200 continues in a block 206.

In the block 206, the server 40 collects data related to the environment of the user during the viewing of the media content item. Environmental data includes where the user viewed the media content item, e.g., at home, in a movie theater, in a law school classroom, etc. Environmental data additionally includes which type of device the user used to view the media content item, the format, e.g., high definition or low definition, size of display, etc., the people with whom the user is viewing the media content item, etc. As an example, sensors 70 such as cameras included in a media device 24 may collect image data of one or more persons watching a media content item in a user location 20. The media device 24 may provide the image data to the data server 40. The data server 40 may, using facial recognition techniques such as are known, identify the user and other persons watching the media content item. Based on the data, the data server 40 may determine with whom the user viewed the media content item.

As another example, the user may view the media content item on the user device 22. A global positioning system (GPS) included in the user device 22 may determine a location of the user device 22 during the viewing experience. The user device 22 may provide data to the data server 40 indicating that, for example the user was riding in a vehicle on Interstate 75 while viewing the media content item. Upon collecting the environmental data associated with the media content viewing experience, the process 200 continues in a block 208.

In the block 208, the data server 40 collects user response data. User response data is data that indicates a user's behavior while viewing the media content item. User response data may include comments made by the user during the viewing of the media content item, facial expressions of the user during the viewing of the media content item, movement of the user (e.g., standing up, walking away, watching intently) during the viewing of the media content item, etc. Sensors 70 included in the user location 20, the user device 22, and/or the media device 24 may monitor the user during the viewing of the media content item and collect user response data. The sensors 70 provide the user response data to the data server 40. Upon collecting and providing the user response data to the data server 40, the process 200 continues in a block 210.

In the block 210, the data server 40 collects user communications data. User communications data include data parsed from digital communications such as emails, social media posts, text messages, etc. User communications data further includes data from user telephone conversations and face-to-face communications.

The data server 40 collects the data via sensors 70, and further via applications included in the user device 22 and media device 24. For example, the user device 22 may be programmed to parse data from emails, text messages, and social media posts and provide the data to the data server 40. Sensors 70 in the user location 20, user device 22 and media device 24 may be programmed to collect audio data from user conversations and provide the audio data to the data server 40. The data server 40 may store the data.

The communications data may relate to media content. For example, the user may explain in a conversation how much the user liked or disliked a media content item to another user. The user may additionally indicate why the user liked or disliked the media content item, i.e., due to the acting, a particular actor, the storyline, the special effects, etc. In such cases, as described in additional detail below, the data server 40 may utilize the data to determine user media content preferences, affinities between users, and correlations between communications and subsequent viewing behavior (usage). The data server 40 may further utilize the data to identify and connect users to each other based on shared media content preferences, diverse media content preferences, etc.

The data server 40 may additionally collect and store communications data unrelated to media content items. For example, the communications may include situation data that indicate that the user is working a lot of overtime, the user is having guests for Thanksgiving, the user is going to retire soon, is on vacation etc. The server 40 may utilize this data to determine correlations between user situations and media usage (or preferences), affinities between users (going through similar life experiences), etc.

Upon collecting the user communications data, the process 200 continues in a block 212.

In the block 212 this data server 40 collects other user data. Other user data includes demographic data such as the age, gender, marital status, level of education, etc. of the user. Other data may further include health data, financial data, affiliations, etc. The data server 40 may collect the other data directly from the user via a graphical user interface (GUI), from forms (tax returns), from communications as described above, from third party communications, etc. Upon collecting the other user data, the process 200 continues in a block 214.

In the block 214, the data server 40 stores the collected data. For example, the data server 40 may establish user accounts for each user within the user database 60. Each user account may include data related to each media content item that the user watched, user responses to the media content item, user usage data related to the media content item, environmental data related to the viewing experience, and other user data.

As described below, the data server 40 may determine one or more parameters related to the user, such as user media preferences, user keywords, a user recommendation list, etc. The data server 40 may additionally store these parameters in the respective user account in the user database 60. The user database 60 may include one or more relational databases, such that correlations between different types of data and/or parameters may be established. Correlations, as used herein, means a mutual relationship or connection, in which one type of data or parameter has a defined relationship (e.g., according to a mathematical function or formula) to another type of data or parameter.

In addition to storing data organized as user accounts, the data server 40 may store data related to media content items within a media content database 62. For example, the data server 40 may, for each media content item, store data indicating who viewed the media content item, ratings of users who viewed the media content item, comments made by users related to the media content item, etc. As with the user database 60, the media content database 62 may include one or more relational databases, such that correlations may be established between different types of media data.

The data server 40 may additionally determine one or more parameters related to the media content items such as a media content rating (based on a plurality of users) and media content keywords.

Upon storing the collected data and determined parameters in the user database 60 and the media content database 62, the process 200 ends.

Figure 3:
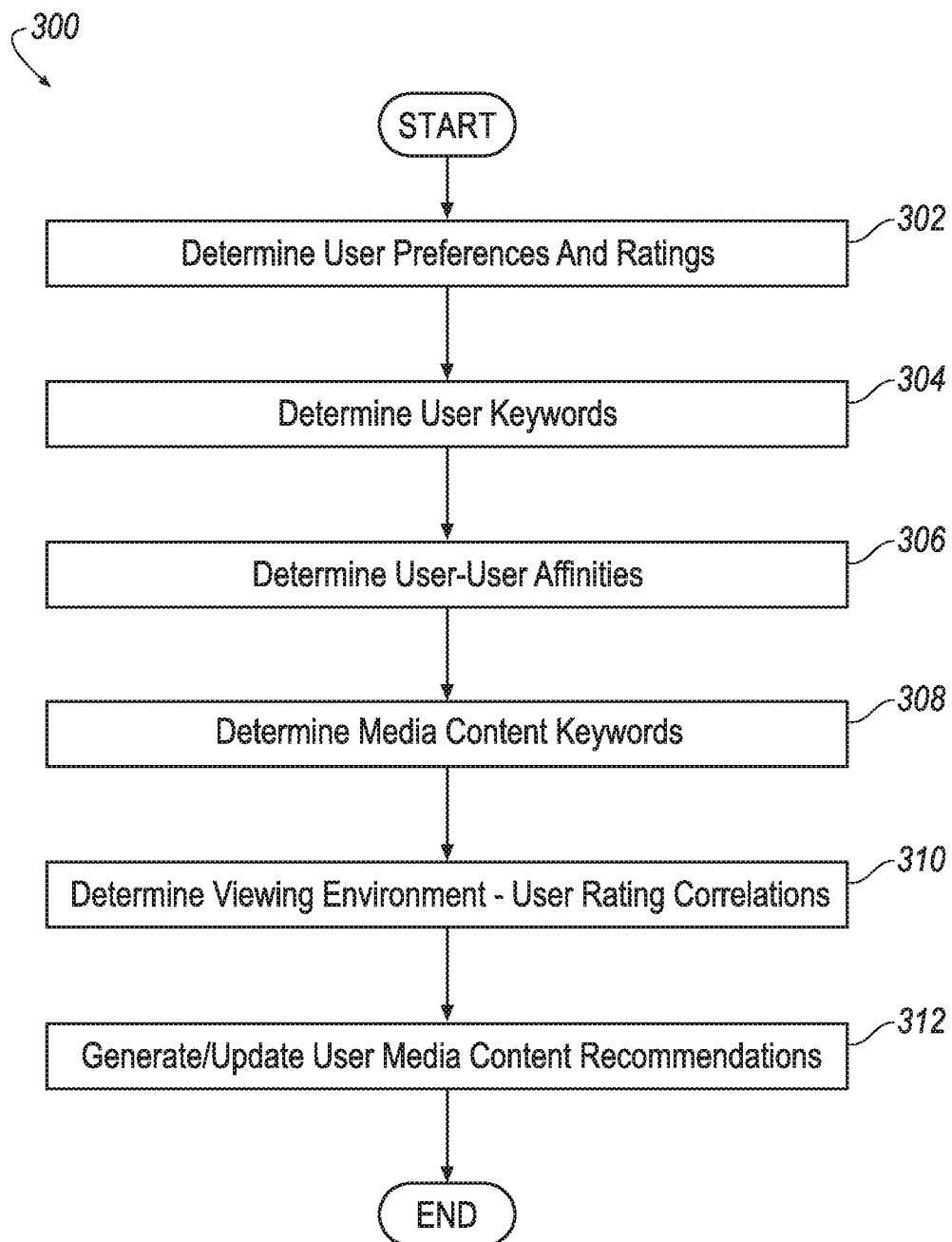
FIG. 3 is a diagram of an exemplary process for determining user and media parameters.

FIG. 3 is a diagram of an exemplary process 300 for determining user indicia of interest for media content. Indicia of interest are indicators of a likelihood that a user will consume and/or enjoy a media content item and include user media preferences and ratings, user keywords associated with media content preferences, and correlations between media viewing environment and user ratings based on collected user data. The process 300 additionally determines user-user affinities and media content keywords. The process 300 starts in a block 302.

In the block 302, the data server 40 determines user media content preferences based on collected user data. User data includes any of the data collected in the process 200. The data server 40 may, for example evaluate user preferences based on different types of user data such as media content usage data, direct user feedback, environmental data related to the media content viewing experience, user response data related to the media viewing, user communications and other user data. Processes may be developed to determine, for example, a score for each category of data for different types of media content, or a particular media content item, normalize each score to a range such as zero to ten, and then average the different scores. Although the discussion below will focus on movies as a type of media content, the processes described apply to many other types of media content such as TV programming, cable programming, audio programming, etc.

As an example, the data server 40 may be programmed to collect and analyze media content usage by a user to determine preferences. Initially, the data server 40 may determine based on collected usage data, which types of movies the user watches. Metadata associated with each movie may indicate a type of the respective movie, such as action, comedy, sports, drama, science fiction, horror, etc. Based on the metadata of the movies watched by the user, the data server 40 may determine for example that 70% of the movies the user watches are action movies, 20% of the movies watched are comedies and the remaining 10% is split up between sports movies and dramas. Based on this usage data, the server 40 may, for example, assign a category score of seven for action movies, two for comedy movies, and 0.5 for sports movies and dramas to the user.

The data server 40 may additionally be programmed to collect/determine ratings from users of individual media content items. In one example, upon determining that a user has completed viewing a media content item, the server 40 may request a numerical rating of the media content item from the user. For example the user may be asked to assign a numerical rating between zero and ten, a number of stars out of five possible stars, etc. If necessary, the numerical rating can be normalized to a scale of zero to ten.

In another example, the user may be asked to provide video feedback. The user may provide comments about the media content item including how much the user liked it, what elements of the media content item the user particularly liked, what elements of the media content item the user did not like, etc. The server 40 may store the video feedback and associate the video feedback with the user.

The server 40 may further analyze the video feedback. Initially, the server 40 may analyze the language of the video feedback using speech analysis as is known. As an example, the server 40 may identify words or phrases indicating a positive or negative response to the movie such as "great," "awful," "waste of time," "engaging," etc. the server 40 may assign values to these words or phrases indicating a positive or negative response. For example, a server 40 may maintain a table of words such as the following:

TABLE 1

| Word or Phrase | Value |
| --- | --- |
| Great | 9 |
| Engaging | 8 |
| awful | 1 |
| waste of time | 1 |
| other word or phrase | assigned value |

Based on the identified words or phrases indicating a positive or negative response, the data server 40 determines a first emotional score. For example the server 40 may take an average of the values of the identified words or phrases.

Additionally, the data server 40 may evaluate voice quality of the video to determine a second emotional score for the user. The data server 40 may utilize voice quality analysis techniques to analyze various qualities of the speech such as speed of the speech, inflection, monotonicity, volume, pitch, etc. The data server 40 may compare the data to data for the general population, or for a demographic segment thereof, e.g., according to age, gender, etc., of the user. Such comparison, using the general population data as a baseline, can be used to evaluate an emotional state of the user, e.g., the user may have a positive or negative emotional state that could be quantified as a percentage worse or better than the general population. For example, speech with a level of contrast within a particular range, e.g., where a pitch of a user's voice varies in frequency by more than a specified amount within a specified time, may indicate that the user is happy, excited, etc. Speech at a speed below a speed threshold or with decreasing volume, e.g., by more than a predetermined decibel threshold, at the end of phrases may indicate that the user is disappointed. The data server 40 may store one or more tables or the like associating values or ranges of values for sound characteristics, e.g., speed of the speech, inflection, monotonicity, volume, pitch, etc., with respective emotional states. Further, the data server 40 may use tables or the like that assign emotional scores, e.g., on a scale of zero to ten, based on the determined emotional state of the user. Positive emotions such as happy may have a high score, e.g., nine or ten. Negative emotions such as disappointment, boredom, etc., may be assigned lower scores such as one or two.

As an example of analyzing voice quality, the server 40 may identify that the speech from the user was fast and included significant pitch variation. The server 40 may determine based on those characteristics that the user was excited about the movie and assign an emotional score of nine.

The server 40 may further evaluate facial expressions of the video feedback to determine a third emotional score. Using facial recognition techniques as are known, the server 40 may determine an emotional state of the user, such as happy, sad, excited, bored, etc. The data server may collect facial expression data such as position of the lips and mouth (forming a smile, forming a frown, lips parted, lips together, edges of mouth spread widely or relaxed and closer together), position of eyebrows (raised, relaxed) position of eyelids (wide open, half-shut, shut), position of forehead (horizontal furrows, vertical furrows, relaxed), etc. The data server 40 may analyze this data to identify expressions such as smiles, frowns, expressions of surprise, expressions of disgust etc. The data server 40 may determine a likely emotional state of the user based on the identified expressions. Additionally or alternatively, as described above with respect to voice quality analysis, the data server 40 may compare user facial expression data with data representative of the general population, or a demographic group corresponding to the user. Based on the comparison, the data server 40 may determine an emotional state of the user. The data server 40 may use tables that assign emotional scores based on the determined emotional state of the user. Expressions may be given values from zero to ten with positive facial expressions getting higher values and negative facial expressions getting lower values. The values may be adjusted based on a determined intensity of the expression. For example, a big smile combined with an expression of surprise may get a nine or ten, while a look of disgust might get a one.

In the case that the server 40 analyzes multiple characteristics of the feedback such as the language, the voice quality of the video and the facial expressions in the video, the server 40 may combine the scores together to generate a single user feedback score, by, for example, determining an average, determining a mean, etc.

The server 40 may further evaluate user response to determine a user rating of a media content item. User response data, as used herein refers to data collected from the user while watching the media content item. For example, sensors 70 associated with a user device 22 may pick up conversations that the user has while watching a movie. Microphones may detect that the user is laughing, or that the user made a comment such as "I love this soundtrack," or "Tom Hanks always delivers," etc. Cameras may detect smiles, expressions of surprise, etc. The data server 40 may assign user response scores on a scale of zero to ten, with positive responses being given larger values, and negative responses being given lower values.

The data server 40 may also determine user preferences and/or ratings from user-user communications. The server 40 may parse words or expressions attributed to a media content item from communications such as text messages, emails, social media posts, etc.

The server 40 may identify and assign values to language in the communications. As described above with regard to user feedback, positive words or expressions may be given higher values and negative words or expressions may be given lower values. For example, the data server 40 may maintain a table of words and expressions, with assigned values. The table may be updated periodically, for example by an operator, to include new words and expressions, so that, over time, the majority of commonly used words and expressions are accounted for. The server 40 may determine an average or mean value of the language of user communications with regard to a media content item.

By combining one or more of the scores as determined above, the server 40 may determine an overall rating of a user for media content items that a user has viewed. Upon determining a user's rating for a particular media content item and/or a user's preference values for types of media content items, the process 300 continues in a block 304.

In a block 304 the server 40 determines user keywords. User keywords, as used herein, are words or expressions that identify particular characteristics or features of a media content item that are determined to be of particular interest to the user. The data server 40 may maintain, for example, for media content in general, or for specific items of media content, a table of keywords that apply to particular characteristics or features of the media content item. The data server 40 may identify keywords in communications, feedback, etc. from the user that are included in the table of keywords.

For example, in user feedback, or in user communications, following the viewing of a media content item, the user may indicate that the user really liked the acting, thought the dialogue was hilarious, and that Jim Carrey was outstanding. Based on these comments, the server 40 might determine the keywords acting, dialogue and Jim Carrey are characteristics of the media content item of particular interest to the user.

When selecting keywords relating a user to a media content item, the server 40 may prioritize keywords that are used in connection with (i.e., appear in the same phrase as) positive expressions such as "great," "amazing," "unforgettable," etc. The data server 40 may parse the language, using speech recognition as is known, to identify phrases within the communication. Based on the identified phrases, the data server 40 may identify phrases that include both a keyword and a positive or negative expression. The data server 40 may further maintain a table of positive and negative expressions, with assigned values to each of the positive or negative expressions. Keywords that are included in phrases having positive expressions may be given a relatively high value, with the actual value depending on the assigned value to the positive expression. Similarly, keywords that are included in phrases having negative expressions may be given relatively lower values.

Keywords may be or include elements of a movie like acting, dialogue, soundtrack, etc. Keywords may further include feelings, moods, impact etc. of the movie such "sad," "uplifting," "feel-good," "spiritual," etc. Keywords may further be contributors to the media content such as actors, screenplay writers, directors, etc.

For each media content item viewed by the user, the server 40 may identify keywords associating the user with the media content item. The server 40 may, based on the keywords identified for the plurality of movies viewed by the user, select keywords that occur most often, and accordingly indicate characteristics or features of media content items that are generally valued by the user.

For example, the server 40 may assign three keywords that associate the user with each movie that the user viewed, based on user feedback and user communications. As described above, the data server 40 may maintain tables of keywords. The data server 40 may assign keywords to the users that occur in the user communications, with keywords that appear more frequently, and/or in association with positive words or expressions being given higher priority. The server 40 may then, based on the plurality of movies viewed by the user, identify the three keywords that were most often assigned to the user. The server 40 may assign these (most often assigned) three keywords to the user as indicative of particular characteristics or features of the media content item of interest to the user. Upon assigning keywords to the user indicating characteristics and features of media content items of particular interest to the user, the process 300 continues in a block 306.

In a block 306 the server 40 determines user-user affinities. User-user affinities, as used herein, are numerical values on, for example, a scale of zero to ten, indicating the degree of relationship between users and further reflecting a degree of shared values with regard to media content. The server 40 determines user-user affinities based on user data as collected in the process 200.

With regard to a degree of relationship, the server 40 may evaluate a quantity of communications between users and amount of time spent together.

For example, the server 40 may determine the number of communications a user has with both other respective users. The server 40 may then rank the other respective users in order of the number of communications and assign a numerical value between zero and 10 based on the ranking. Users with the ranking the top 10% they receive a numerical value of 10, users use with a ranking between the top 20% and the top 10% they receive a numerical value of nine, etc.

The server 40 may further determine based on communications whether the users spend time together, have lunch together, work together, etc. The server 40 may assign the user-user affinity value in part based on how much time the users spend together and in which context.

The server 40 may further determine a correlation in media content usage between users, and assign a numeric value to the correlation. The value may be, for example in a range of from zero to ten. As part of determining the affinity between two users, the server 40 may determine how many media content items were viewed by both of them. In the case that there is a large overlap in the media content viewed by the two users, the server 40 may assign a high numeric value for affinity associated with media content usage such as nine or ten. In the case that there is little or no overlap, the server 40 may assign a low numeric value for affinity associated with media content usage such as zero or one.

Still further, the server 40 may evaluate a correlation between users based on keywords. The server 40 may assign a high keyword affinity value to users that have a large number of same keywords and a low keyword affinity value to users whose assigned keywords do not have a significant overlap.

Values such as the numeric value for affinity associated with media content usage and numeric value of affinity based on keywords may be normalized, for example, to a range of zero to ten, such that they may be averaged to determine an overall affinity value between each pair of users.

The server 40 may then combined by averaging, determining a mean, or other statistical methods to determine an overall affinity value for each user-user pair. As described above, user-user affinities, as used herein, are numerical values on, for example, a scale of zero to ten, indicating the degree of relationship between users and further reflecting a degree of shared values with regard to media content. A higher value typically indicates a higher affinity.

Weighted averages may also be determined. Some of the partial affinity ratings, for example "degree of relationship" may be weighted more highly than other partial affinity ratings, such as "keyword affinities". The data server 40 may maintain a table and/or algorithm that indicates the weighting to apply to each partial affinity rating. Upon determining an affinity value for each user-user pair, process 300 continues in a block 308.

In the block 308, the server 40 determines media content keywords. As used herein, media content keywords indicate characteristics or features of a media content items identified by users as particularly applying to the media content item. Based on user data such as user feedback data and user communications, the server 40 identifies keywords for media content from respective users who have viewed/commented on the media content item. Based on the frequency with which users associate particular keywords with the media content item, the server 40 may rank the keywords. The server 40 may then identify the highest ranking keywords and assign them to the media content item. For example, the server 40 may choose the five highest ranking keywords and assign them to the respective media content item. The server 40 may do this for each media content item that the data server 40 is tracking. Upon assigning keywords to the respective media content items, the process 300 continues in a block 310.

In the block 310, the server 40 determines correlations between the environment in which the user viewed a media content item and the user rating of the media content item. As discussed with regard to the process 200, the server 40 collects data indicating where, with whom, on what type of device, etc. a user views a media content item. This data may be stored in association with the media content item that was viewed.

Upon determining a user rating of the media content item for the user as described in block 302, the server 40 may determine one or more environmental scores indicating a degree to which a respective environmental characteristic in the viewing environment has a correlation (as defined above) with a higher rating by the user. For example, a correlation between the positive rating and the characteristics of the environment in the present context means that characteristics of the environment statistically tended to result in a positive rating. A positive rating, as used in this context may mean a rating above a certain threshold, for example eight on a scale of from zero to ten. Alternatively, a positive rating may mean, for example, that movies viewed with the characteristic of the environment present, are higher, on average, than ratings for movies viewed with the characteristic absent.

The data server 40 may determine an environmental score for the correlation in a range of from zero to ten. High environmental scores, such as nine or ten indicate that the environmental characteristic significantly correlated to a positive rating. Low environmental scores such as zero or one indicate that the environmental characteristic did not significantly correlate to a positive rating.

The data server 40 may identify characteristics of the environment that statistically support a high rating. For example, the data server 40 may determine that an average rating of media content items viewed by a user with a particular friend is 8.5 and that the average rating of media content items viewed by the user alone is six. In a similar manner, the server 40 may evaluate other environmental criteria such as viewing at home versus viewing in a theater, viewing on a large screen TV versus viewing on a mobile device, etc. Characteristics of the environment that support a high rating may receive a high environment score, and characteristics of the environment that did not support a high rating a relatively low environmental score. Upon determining correlations between the environments in which the user viewed the media content items and the user positive ratings of the respective media content items, the process 300 continues in a block 312.

In the block 312, the data server 40 is programmed to generate or update user media content recommendations, based on user data as collected in the process 200. The data server 40 determines a recommendation score for each media content item, indicating the likelihood that the user will enjoy the media content item. The recommendation score may be a numerical value in a range from zero to ten. As described below, the data server 40 may determine a plurality of partial recommendation scores and combine the partial recommendation scores to determine the recommendation score. Upon determining the recommendation score for each media content item, the data server 40 may rank the media content items based on the scores and present the ranked list to the user.

The data server 40 is programmed to identify and rank media content items based on user preferences, user keywords, user-user affinities, media content keywords, and other data. The data server 40 may, for example generate partial scores for different categories of data, and combine the scores to rank media content items for a particular user.

The data server 40 may generate a first partial recommendation score based on the user preferences. For example, as described with respect to the block 302 above, the data server 40 may determine, for a first user, a score related to a type of media content such as action, comedy, etc., for each media content item viewed by the first user. The data server 40 may determine the type of the media content item based on metadata associated with the respective media content item and assign a first partial recommendation score based on the type. Using the example given in block 302, the data server 40 may assign a score of seven for action movies, a two for comedies, a 0.5 for sports or drama movies, and zero for other types of movies.

The data server 40 may determine a second partial score based on user keywords as they correlate with media content keywords. For example, for each media content item to be ranked for a first user, the data server 40 may determine a degree to which first user keywords associate to the media content keywords. In this context, for keywords to "associate" to each other may mean that the keywords match, i.e., are identical, as in a user keyword "acting" and a media content keyword "acting". Keywords associating may also mean, however, having a similar meaning. For example, the data server 40 may determine that a user keyword of "happy" matches a movie keyword of "joyful". The data server 40, for example, may maintain a table indicating keywords that associate to one another.

A close association, for example, the three highest ranked first user keywords matching media content keywords, may be assigned a high second partial recommendation score, such as nine or ten. In the case that there is less correlation between the first user keywords and media content keywords, the data server 40, may assign a proportionately lower score.

The data server 40 may determine a third partial recommendation score based on user-user affinities and feedback of other users related to media content items. The data server 40 may calculate the third partial score by, for example, combining the feedback regarding the media content item of second users connected to the first user, and taking the average. Prior to taking the average, the feedback of each of the second users may be weighted by the affinity between the respective second user and the first user. Second users connected to the first user may be, for example, users for which an affinity value has been determined, users who are members of a group together with the first user, users who have friended each other in a social media platform, etc.

The data server 40 may determine a fourth partial recommendation score based on recommendations received by the first user from second users. As described in additional detail with regard to the process 500 below, the data server 40 may identify second users whose communications with the first user correlate with first user subsequent media content usage. In the case that a second user whose communications are determined to correlate with the first user's media content usage recommends a media content item to the first user, the data server 40 may assign a high fourth partial score such as nine or ten. In the case that no second user has recommended the media content item, the data server 40 may assign a middle range values such as five or six. In the case that a second user who's communications are determined to correlate with the first user's media content usage provides negative input to the first user with regard to the media content item, the data server 40 may assign a low values such as zero or one. In the case that the first user receives input from multiple second users, the data server 40 may combine the inputs to determine an average for the fourth partial score.

Upon determining the one or more partial recommendation scores for each media content item, the server 40 may determine an overall recommendation score for the first user by combining the partial scores. The partial recommendation scores may be combined for example by averaging, determining a mean, or other suitable statistical methods.

The data server 40 may further update the recommended media content list for the first user based on the updated recommendation score of the media content item by adjusting the ranking of the media content items in the list or inserting the media content item in the recommendation list.

Figure 4:
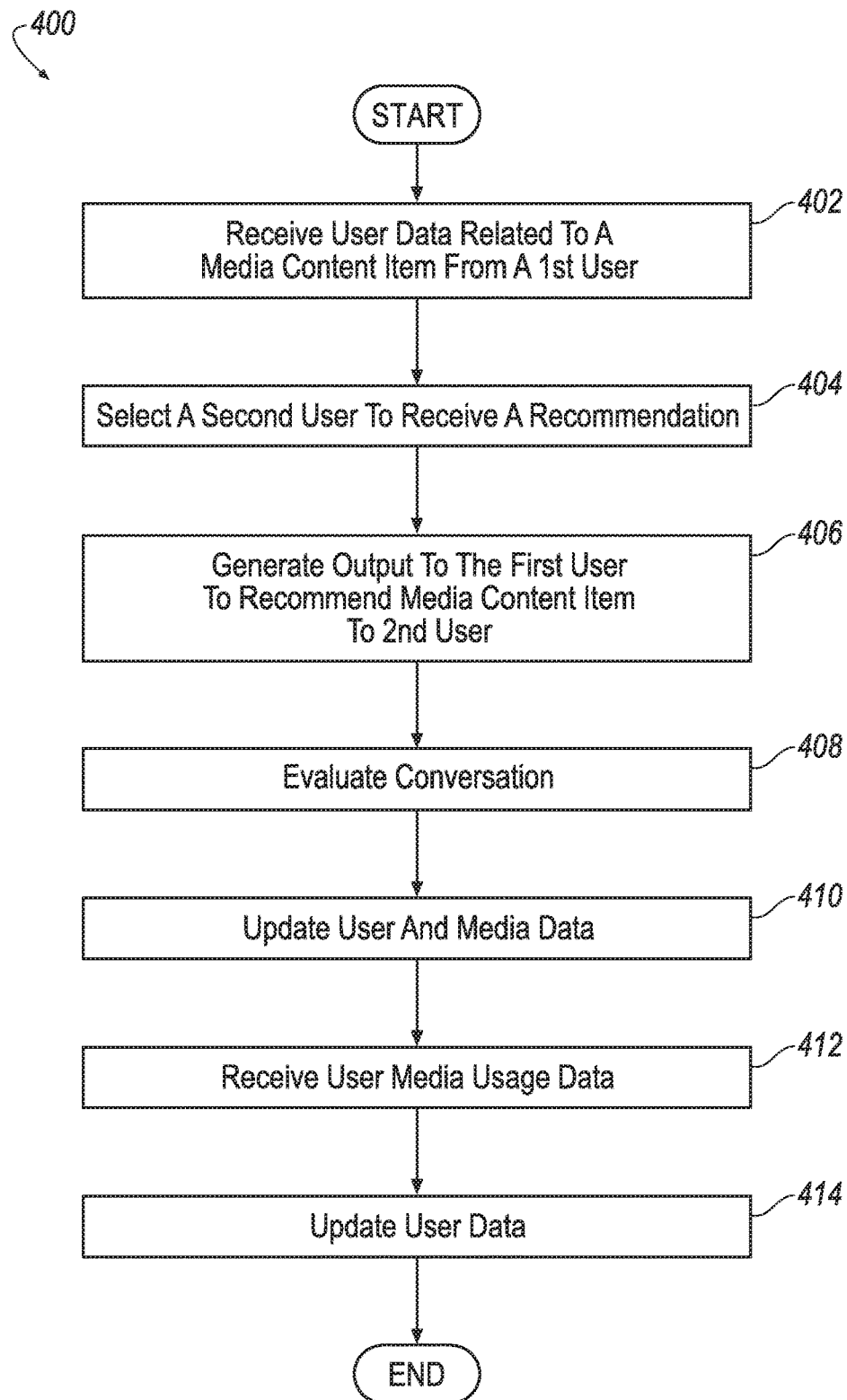
FIG. 4 is a diagram of an exemplary process for initiating interactions between media content customer systems.

FIG. 4 is a diagram of an exemplary process 400 for initiating user-user interactions based on user data. The process 400 starts in a block 402.

In the block 402, the data server 40 receives user data from a first user related to media content item. For example, the data server 40 may detect that the first user finished viewing a media content item and request feedback from the user related to the media content item. The user may provide comments via a user device 22, which may record a video of the user's comments.

As another example, the data server 40 may receive data from first user communications related to the media content item. As described with regard to the process 300, the data server 40 may parse data from the communications.

Based on the user data, the data server 40 may determine a user rating or other indicia of interest for the media content item, as described with regard to the process 300. Upon receiving the user data and determining a user rating or other indicia of interest for the media content item, process 300 continues in a block 404.

In the block 404, the data server 40 selects a second user to receive communication from the first user related to the media content item.

As a first step, the data server 40 may search for users connected with the first user, and who have not yet viewed the media content item. Other users connected with the first user may include, for example, other members of a group in which the first user belongs. The group may be formed, for example, explicitly for sharing media content viewing experiences.

As another example, the data server 40 may identify other users connected with the first user as being all users having an assigned affinity with the first user, or users having an affinity with the first user above a first threshold value.

Upon having identified a group of users connected with the first user and who have not yet viewed the media content item, the data server 40 may select, from the group, a second user to receive a communication from the first user. For example, the data server 40 may identify the second user by determining the user in the group with the highest affinity with the first user. As an alternative, the data server 40 may identify the second user by determining the user in the group whose keywords or other indicia of interest most closely correlate with the first user's keywords or other indicia of interest. As yet another example, the data server 40 may identify the user by determining the user in the group who has most recently spoken with the first user.

The data server 40 may use other criteria for determining a second user to receive a recommendation from the first user. For example, the data server 40 may identify, from the group of users who are associated with the first user and who have not yet viewed the media content item, based on length of time since the first user and the second user have spoken. As one example the data server 40 may determine the second user to be the user in the group with whom first user has most recently spoken. As another example, the data server 40 may determine the second user to be a user in the group with whom the first user has not spoken for a period of time greater than a predetermined period of time, in order to reconnect the first user and the other user.

Upon selecting the second user to receive the communication from the first user, the process 400 continues in a block 406.

In a block 406, the data server 40 generates output to the first user to recommend the media content item to the second user. For example, the data server 40 may send to the user device 22 associated with the first user, a text message indicating that the first user should call the second user and recommend the media content item. The output may include contact information for the second user such as a telephone number, email address, link to send the message, etc.

In some cases, the data server 40 may be programmed to establish a communication link between a first user device 22 associated with the first user and a second user device 22 associated with the second user. For example, the data server 40 may send a graphical user interface (GUI) to the first user indicating that the first user should recommend the media content item to the second user. The GUI may provide a link that initiates a telephone call between the user device 22 associated with the first user and the user device 22 associated with the second user.

The discussion above addresses connecting a first user to a second user. However, the data server 40 may be programmed to connect multiple users in a conversation. For example, the data server 40 may create a chat site, and invite multiple users to join the chat site at a particular time. One or more of the users may already have viewed the media content item, while one or more other media content users may not yet have viewed the media content item.

Upon establishing the communication between the first user and the second user, the process 400 continues in a block 408.

In the block 408, the data server 40 is programmed to evaluate the conversation between the first user and the second user. The conversation may be evaluated based on one or more criteria to determine a conversation score. The conversation score may be an indication of whether the users participating in the conversation enjoyed the conversation, and whether the conversation had an impact on future user behavior. The data server 40 may determine the conversation score by determining and subsequently combining one or more partial conversation scores.

For example, a first partial conversation score for evaluating the conversation may be based on indicators of a quality of the interaction between that the first user and the second user. Indicators of an interaction quality may include a length of the conversation, positive content such as language indicating that one of the users really enjoyed speaking with the other user or the users, the first and second users planning to meet each other, and voice quality data indicating that the first and second users are happy, language indicating a lot of agreement between the first and second users, etc.

One or more of these indicators may be evaluated, and assigned a numerical value. As a first indicator, the data server 40 may maintain a table of lengths of a conversation (measured in minutes) and assign a value to different lengths. The data server 40 may then, measure a length of the conversation (in minutes) and assign a value based on the table A length of the conversation of 15 minutes or more may be assigned a value of ten. Conversation from 12 to 15 minutes may be assigned a value of nine. A conversation with a length of ten to 12 minutes may be assigned a value of eight, etc.

As a second indicator, the language of the conversation may be evaluated and assigned a value for a level of positive interaction. The values may be in a range from zero to ten. The data server 40 may be programmed to search the language of the conversation, for positive comments from one user toward the other, and to assign values to the comments. The data server 40 may, for example, maintain a table of expressions, and assign each expression a value. Expressions like "thanks so much for calling," "I'm so happy to hear from you," etc. may be assigned a value such as nine or ten. Expressions such as "what's up," "I am busy right now," etc. may be given a low value such as two or three.

As a third indicator, the data server 40 may be programmed to evaluate the voice quality of each of the first and second users during the conversation. Using voice analysis as is known, the data server 40 may evaluate voice qualities such as the speed, about of inflection, volume, pitch, etc., of each of the first and second users. As described with regard to the block 302 of process 300, based on these various qualities of the speech, the server 40 may determine, for example, that the user was excited, happy, disappointed, etc., and assign the an emotional score to the user's speech. The data server 40 may use tables that assign emotional scores based on the determined emotional state of the user. Positive emotions such as happy may have a high score of nine or ten. Negative emotions such as disappointment, boredom, etc., may be given lower scores such as one or two.

The different indicators of a quality of the interaction may be combined to form a first partial conversation score.

A second partial conversation score may be based on a degree to which parameters such as an affinity between the first and second user changes, keywords for the first or the second user, keywords for the media content, etc. are updated. As described in regard to the process 300, the data server 40 may update affinities between users, keywords associated with a user, and keywords associated with media content items, based on user data received from user-user communications.

The data server 40 may assign a value between zero and ten to the amount of change in an affinity value between the first user and the second user. The data server 40 may assign, for example, a numerical value of one for a 0.1 change in the affinity value, two for a 0.2 change in the affinity value, up to a value of ten for a one point change or more in the affinity value.

Further, the data server 40 may assign a value between zero and ten to the changes to keywords associated with the first user, second user or media content item. For example, a change in a keyword associated with one of the first user (e.g., the list of top three keywords changes), second user and media content item may be assigned a value of five, a change in a keyword to two of the first user, second user and media content item may be assigned an eight, and a change in keyword for three of the first user, second user and media content item may be assigned a ten.

The data server 40 may be programmed to determine the second partial conversation score by combining the score associated with the change in affinity between the first and second users and the score associated with the change in keywords. For example, the data server 40 may be programmed to take an average of the scores.

Based on the first and second partial conversation scores, the data server 40 may be programmed to determine an overall conversation score, by for example averaging the first and second partial scores.

Additional factors may be considered in determining a conversation score. Further, the conversation score is not static, but may change over time. For example, usage of media content by one of the first user and second user and/or behavior related to the relationship of the first and second user subsequent to the conversation may be considered, and the conversation score updated. As described with regard to the process 200, the data server 40 may collect user data periodically or even continuously or almost continuously. The data server 40 may increase the conversation score based on data indicating that the second user viewed the media content item following the conversation. Similarly, the data server 40 may increase the conversation score based on data indicating that the first user and second user had increased interactions, such as conversations, meetings with each other, etc., subsequent to the conversation.

Upon determining the conversation score, the process 400 continues in a block 410.

In a block 410, the data server 40 is programmed to update first user data, second user data, and the media content item data. The data server 40 is programmed to store the conversation and associate the stored conversation with each of the first and second user. The data server is 40 is further programmed to update first user, second user, the media content keywords as determined in the block 408. Still further, the data server 40 is programmed to update first user and second user affinities, and other user and media parameters that may be influenced by the conversation. Upon updating the first and second user data, the process 400 continues in a block 412.

In the block 412, the server 40 is programmed to receive first and second user media usage data. For example, subsequent to the conversation, the second user may view the media content item discussed during the conversation. Further, subsequent to the conversation, the first and second users may have additional interactions, such as conversations, text communications, meetings, etc. Upon receiving the additional us usage data, the communications data, etc. related to the first and second users, the process 400 continues in a block 414.

In the block 414, the server 40 is programmed to update first user data, second user data, media content data, and when applicable, the conversation score based on the usage data and communications data received in the block 412, as described above.

Figure 5A:
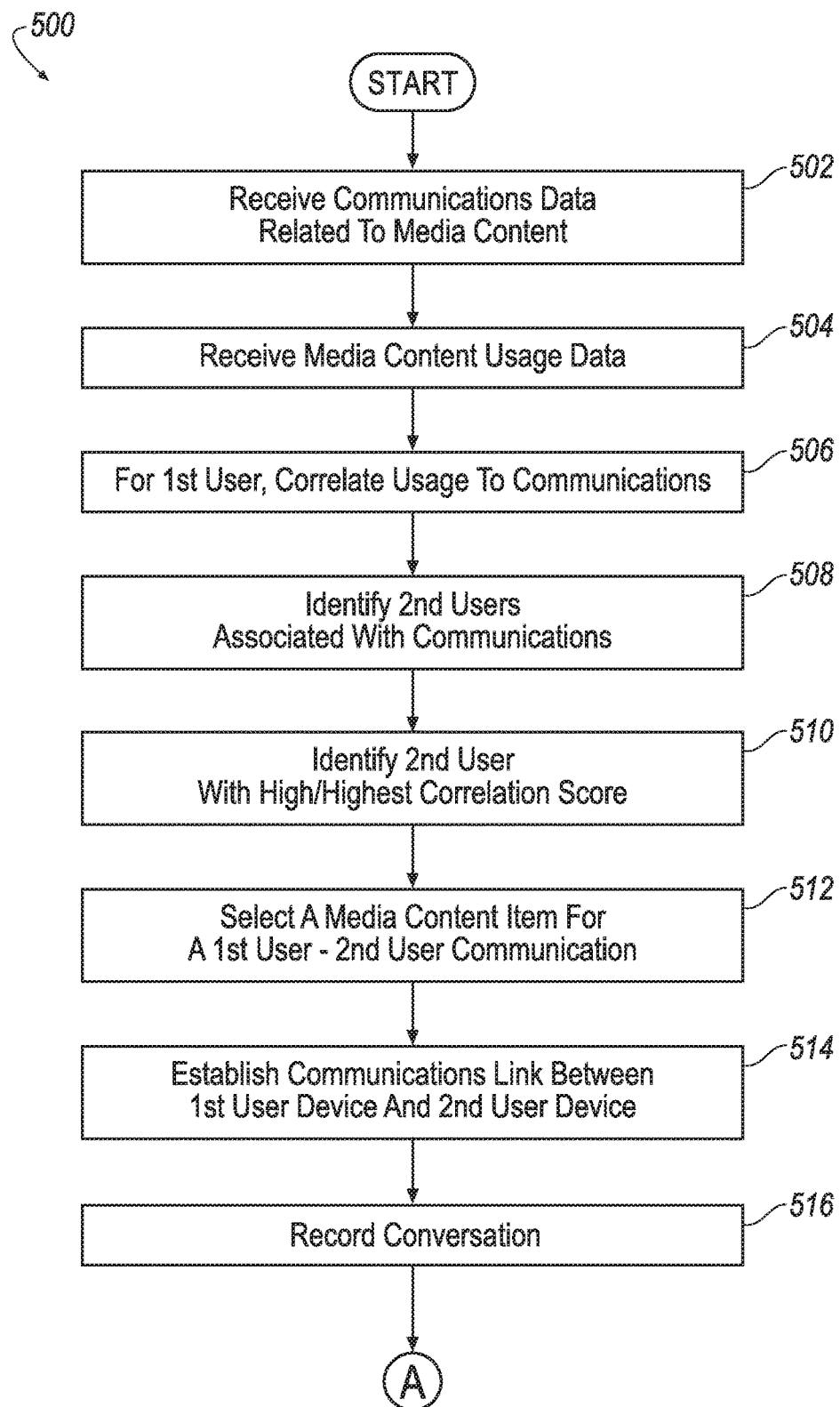
FIGS. 5A and 5B are a diagram of a further exemplary process for initiating interactions between media content customer systems.
Figure 5B:
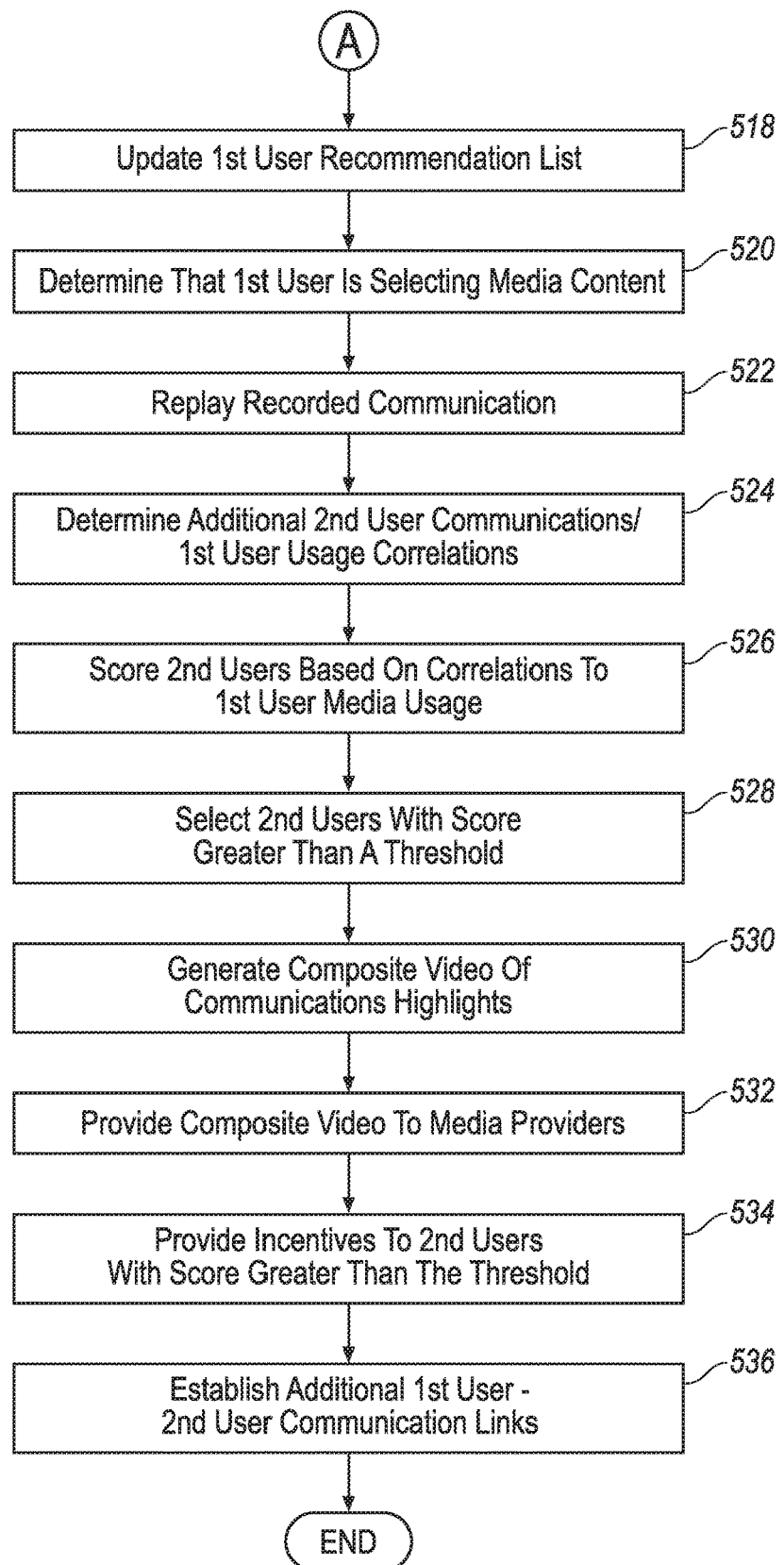

FIGS. 5A and 5B are a diagram of an exemplary process 500 for initiating user-user interactions based on correlations between usage data and previous user-user communications. The process 500 begins in a block 502.

In the block 502, the data server 40 is programmed to receive communications data related to media content from one or more users. The communications data may include, for example, text messages, emails exchanges, etc. between users. The communications data may further include conversations between users. As described with regard to the process 200, the data server 40 is programmed to associate the communications data with respective users, and store the communications data in the user database 60. Upon receiving and storing the communications data, the process 500 continues in a block 504.

In the block 504, the data server 40 is programmed to receive media usage data associated with users. As described in regard to the block 202 of process 200, usage data includes the identify of media content items viewed by the user, when the user viewed the respective media content items, the type of device the user used to view the media content items, and other data indicating user media content viewing behavior. Usage data further includes actions taken by the user during the viewing of the media content item such as rewinding the media content to review a segment, fast forwarding the media content item to skip a segment, channel surfing during the viewing of a media content item, choosing to record the media content item while viewing it, etc. The data server 40 is programmed to associate usage data with respective users, and store the user data in the user database 60. Upon receiving and store the usage data, the process 500 continues in a block 506.

In the block 506, the data server 40 is programmed, for a first user, to correlate usage data with previous communications. That is, the data server 40 analyzes first user consumption of media content in light of communications of the first user to identify communications that may have impacted the first user's choice of media content. As used within the description of the process 500, "first users" refers to users in the role of consuming media content following communications with other, second users. Also within the description of process 500, "second users" refers to users in the role of communicating with first users regarding media content items. The data server 40 can consider each user within a group of users in both of the roles of first user and second user.

The data server 40, based on first user usage data, determines what media content the first user views, as described above with regard to process 200. The data server 40 then searches communications from the first user in a predetermined time preceding the viewing of the media content item, for communications related to the media content item. Identifying communications encouraging the first user to view a media content item in the predetermined period of time indicates that the communications may have influenced the first user's decision.

As an example, each time that the data server 40 determines, based on usage data, that the first user has viewed a media content item, the data server 40 may be programmed to initiate a search of the communications received by the first user (or communication exchanges in which the first user participated) for a preceding time period. The preceding time period may be, for example, one week, or another suitable time.

Specifically, the data server 40 may be programmed to search the communications in which the first user participated during the time period to identify any references to the movie. In the case that the data server 40 identifies one or more first user communications including references to the movie, the data server 40 may analyze each of the communications to determine whether the communications encouraged the first user to view the movie or discouraged the first user to view the media content item. Using speech recognition techniques as are known, the data server 40 may look for comments such as "you really need to see this movie, it is amazing", "I saw that movie, it was a waste of time", etc. The data server 40 may assign scores to such expressions. Highly encouraging expressions may be given, for example, a nine or a ten. Highly discouraging expressions may be given a score of zero or one. Neutral expressions, such as "It was alright;" may be given a middle score such as five or six. The data server 40 may maintain a table of expressions with assigned values. The data server 40 may, in this manner, establish a score for each communication with the first user related to the media content item.

The data server 40 may then assign a correlation score for each communication relative to the first user's subsequent behavior. In the case, that the data server 40 identifies one or more communications encouraging the first user to view the media content item prior to the first user actually viewing the media content item, the server 40 may determine that there was a positive correlation between the communication and the first user behavior and assign a correlation score of nine or ten. On the other hand, in the case of the data server 40 identifies one or more communications discouraging the first user to view the media content item, but the first user views the media content item anyway, the data server 40 may determine that there was a negative correlation between the communication and the first user behavior and assign a correlation score of zero or one. In the case that the communication included neutral expressions, and the first user viewed the media content item anyway, the data server may assign a correlation score of five or six.

With each media content item that the first user views, the data server 40 continues the process of correlating previous communications with first user viewing behavior. In each case, the data server 40 determines whether the communication has a positive or negative correlation.

The process of correlating first user media content usage with previous communications is described above with regard to a single first user. The process, however, can be applied respectively to a plurality of first users. Upon assigning positive or negative correlation values to communications referring to the respective media content items, the process 500 continues in a block 508.

In the block 508, the data server 40 is programmed to identify second users that are parties to positively correlating communications. That is, the data server 40 identifies the participants in conversations, the authors of emails and text messages, etc. that were positively correlated with first user media usage. Upon identifying the second users that are parties to the positively correlating communications, the process 500 continues in a block 510.

In a block 510, the data server 40 is programmed to identify a second user whose communications highly correlate with first user's media content usage. For example, the data server 40 may rank second users according to the number of positively correlating communications the second user had with the first user. The data server 40 may select the second user with the highest number of positively correlating communications. As another example, the data server 40 may calculate a user correlation score for one or more respective second users based on the communications correlation data. The data server 40 may determine the user correlation score for each of the one or more second users by subtracting the number of negatively correlating communications from the number of positively correlating communications. The data server 40 may further normalize the user correlation scores for the respective second users to a range of from zero to ten. Again, the data server 40 may be programmed to select the other user with the highest user correlation score. Upon selecting a second user whose communications highly correlate with the first user's media content usage, the process 500 continues in a block 512.

In the block 512, the data server 40 selects a media content item as a basis for a first user-second user communication. For example, the data server 40 may determine, based on usage data that the second user has just completed viewing a media content item. Based on an association of first user and second user keywords, and/or the affinity between the first user and second user being greater than a predetermined threshold, the data server 40 may determine that the media content item would be a candidate media content item for the second user to recommend to the first user.

As another example, the data server 40 may inform a media content provider of media content items viewed by the second user. The media content provider may send a request to the data server 40 indicating that a particular media content item viewed by the second user would be a candidate media content item for the second user to recommend to the first user.

Additionally or alternatively to selecting a media content item as a basis for a first user-second user communication, the data server 40 may, in a similar manner, select a media content item as a basis for communications between the second user and another user, for example a third user.

Upon selecting the media content item as a basis for a first user-second user or third user-second user communication, the process 500 continues in a block 514.

In a block 514, the data server 40 is programmed to establish a communication link between a user device 22 associated with the first user or third user and a second user device 22 associated with the second user. For example, the data server 40 may send a graphical user interface (GUI) to the second user via the second user device 22 recommending that the second user discuss the media content item with the first user. The GUI may provide a link that establishes a telephone call between the second user device 22 associated with the second user and the first user device 22 associated with the first user. Alternatively, the data server 40 may set up, for example, a chat room and invite the first and second users to join the chat room, etc. Upon establishing a communications link between the first user and a second user, the process 500 continues in a block 516.

In the block 516, the data server 40 is programmed to record the conversation or text based communication. Upon recording the conversation or text based communication, the process 500 continues in a block 518.

In the block 518, the data server 40 updates a first user recommendation list based on the recorded conversation. As described above with regard to the block 312, the data server 40 will determine or update a recommendation score for the first user with regard to the media content item and when applicable, adjust a media content recommendation list for the first user. Adjusting the media content recommendation list may include adding the media content item to the recommendation list. Upon adjusting the media content recommendation list for the first user, the process 500 continues in a block 520.

In the block 520, the data server 40 determines that the first user is selecting a media content item. For example, based on usage data from the first user, the data server 40 may determine that the first user has turned on the media device 24 in the first user's location 20 and is searching the user's media content recommendation list, channel surfing, etc. As another example, the data server 40 may determine that the first user is watching a trailer for the media content item. Upon determining that the first user is searching for a media content item, or considering watching the media content item, the process 500 continues in a block 522.

In the block 522, the data server 40 presents the recording between the first user and the second user regarding the media content item. In this manner, the data server 40 can remind the first user of the excitement, enthusiasm, etc., experienced during the conversation, and can take this into consideration in deciding whether to view the media content item.

Upon presenting the recording between the first and second user to the first user, the process 500 continues in a block 524.

In the block 524, the data server 40 identifies additional second user communications that correlate to first user media usage. Following the process 500 as described in the blocks 502 through 510 above, the data server 40 identifies, for a plurality of first users, correlations of second users with the media usage of the first users.

As described in the block 506, the data server 40 identifies for each first user, the communications that correlate with first user media content consumption. As described in the block 508, the data server 40 further associates second users with the respective communications. Further, as described in the block 510, the data server 40 determines second user correlation scores correlating respective first user media consumption with the communications from the respective second users. Upon determining the additional correlation scores of respective second user communications to respective first user media usage, associating respective second users with the respective communications, and determining user correlation scores correlating second users with respective first user media usage, the process 500 continues in a block 526.

In the block 526, the data server 40 determines, for one or more second users, an influence score indicating a correlation of the second user communications with the media usage for a plurality of first users. The data server 40, for example, can determine the influence score for each second user based on the respective scores correlating the second user with each of the respective first users, as determined in the block 524.

The data server 40, can, for example, select a group of first users. The group of first users can be, for example, all of the plurality of users considered in the block 524 for which correlation scores are available. Alternatively, the group of first users can be all of the users from the plurality of users that subscribe to a particular group related to media content usage for which correlation scores are available. Additionally or alternatively, the data server 40 can select first users to be users for which correlation scores are available that have viewed a minimum of a certain number of media content items within a predetermined time period, for example 20 media content items in the last 90 days.

Upon selecting the group of first users, the data server 40 may, for each second user, combine the correlation score of the second user communications with each of the selected first users into an influence score by, for example, determining an average, determining a mean, or other mathematical combination. Upon determining the influence score for each second user, the process 500 continues in a block 528.

In the block 528, the process 500 selects second users with an influence score above a predetermined threshold. For example, the influence scores may be normalized to a range of zero to ten, and the predetermined threshold may be established to be eight. Upon selecting second users with an influence score above the predetermined threshold, the process 500 continues in a block 530.

In the block 530, the data server 40 generates a composite video of communications highlights, related to a media content item. The data server 40 identifies communications related to a specific media content item from second users with influence scores above the predetermined threshold. For one or more of the communications, the data server 40 identifies segments of the communications to include in the composite video. The segments of the communications may be selected, for example, based on characteristics that indicate a positive content or positive emotion.

The data server 40 may identify segments of the communications, such as phrases or sentences, using speech recognition techniques as are known. The data server 40 may then analyze, as described below, the segments for characteristics and assign a segment score that indicates a positive content or positive emotion and select the segments with a segment score above a predetermined threshold to include in the composite video.

The segment score may be determined based on one or more of (a) words or expressions within the segment, (b) voice quality of the second user within the segment, and (c) facial expressions of the second user during the segment.

The data server 40 may determine a first partial segment score based on words or expressions with the segment. The data server 40 may maintain a table of words and phrases indicating a positive or negative response to the media content item such as "great," "awful," "waste of time,", "engaging.", etc. The data server 40 may assign values between zero and ten to these words and phrases indicating a positive or negative response to the media content item, as shown in Table 1, above. Based on the identified words or phrases indicating a positive or negative response within each segment, the data server 40 determines a first partial segment score for the segment. The first partial segment score may be determined as, for example, an average of the values assigned to the words and expressions within the segment.

The data server 40 may determine a second partial segment score based on the voice quality of the second user within the segment. As described with regard to the block 302, the data server 40 may utilize voice quality analysis techniques to analyze various qualities of the speech such as speed of the speech, inflection, one of tonicity, volume, pitch, etc. the data server 40 may store one or more tables or the like associating values or ranges of values for sound characteristics, for example, speed of the speech, inflection, want to the city, volume, pitch, etc., with respective emotional states. Further, the data server 40 may use tables or the like that assign emotional scores for example, on a scale of zero to ten, based on the determined emotional state of the second user. Positive emotions such as "happy," "excitement," etc. may be assigned high scores, e.g., nine or ten, and negative emotions such as disappointment, disinterest, etc., may be assigned lower scores such as one or two. The data server 40 may then determine the second partial segment score to be, for example, the emotional score for the segment based on the voice quality of the second user.

The data server 40 may determine a third partial segment score based on facial expressions of the second user during the segment. Using facial recognition techniques as are known, the data server 40 may determine an emotional state of the second user such as happy, sad, excited, bored etc. As described with regard to the block 302, the data server 40 may collect facial expression data such as position of the lips and mouth, position of the eyebrows, position of eyelids, position of four head, etc. The data server 40 may analyze this data to identify expressions such as smiles, frowns, expressions of surprise, expressions of disgust, etc. The data server 40 may determine a likely emotional state of the user based on the identified expressions. The data server 40 may further use tables and assign an emotional scores based on the determined emotional state of the user. Expressions may be given values from zero to ten with positive facial expressions getting higher values and negative facial expressions getting lower values. Based on the identified facial expressions indicating the likely emotional state of the user during each segment, the data server 40 determines a third partial segment score for the segment. The third partial segment score may be determined as, for example, the assigned emotional score to the facial expression of the second user during the segment.

The data server 40 may then determine a segment score based on the one or more partial segment scores. For example, the data server 40 may take an average of the first, second and third partial segment scores to determine the segment score.

Upon assigning segment scores to the segments in the communications from the second users, the data server 40 selects segments to include in the composite video. For example, the data server 40 may select the segments from the second users' communications with segment scores above a predetermined threshold, e.g., nine. As another example, the data server 40 may select the ten segments from second users' communications with the highest segment scores. As yet another example, the data server 40 may rank the segments according to segment scores, and select as many of the highest-ranking segments as fit within a predetermined composite video length.

The data server 40 then combines the segments to form a composite video. Upon creating the composite video, the data server 40 continues in a block 532.

In the block 532, the data server 40 provides the composite video to one or more media content providers associated with the media content item which is the subject of a composite video. Upon providing the composite video to the one or more media content providers, the process 500 continues in a block 534.

In the block 534, the data server 40 communicates incentives to the identified second users with correlation scores greater than a predetermined threshold. The incentives may be conceived to encourage the second users to communicate with first users regarding media content items. For example, the second user may receive points which can be exchanged for items such as the streaming of media content items or tickets to movie theaters for each first user who views a media content item following communications with the second user. Upon communicating the incentives to the second users, the process 500 continues in a block 536.

In the block 536, the data server 40 recommends and/or establishes additional communications between first users and second users. As described with regard to the blocks 512 and 514, the data server 40 identifies a first user to receive a communication from a second user, and a media content item as a topic for the communication. The data server 40 then outputs a recommendation to the second user to communicate to the first user with regard to the media content item, and/or establishes a communications link between a first user device associated with the first user and a second user device associated with the second user. Upon recommending/establishing a communication between the first and second users, the process 500 ends.

Figure 6:
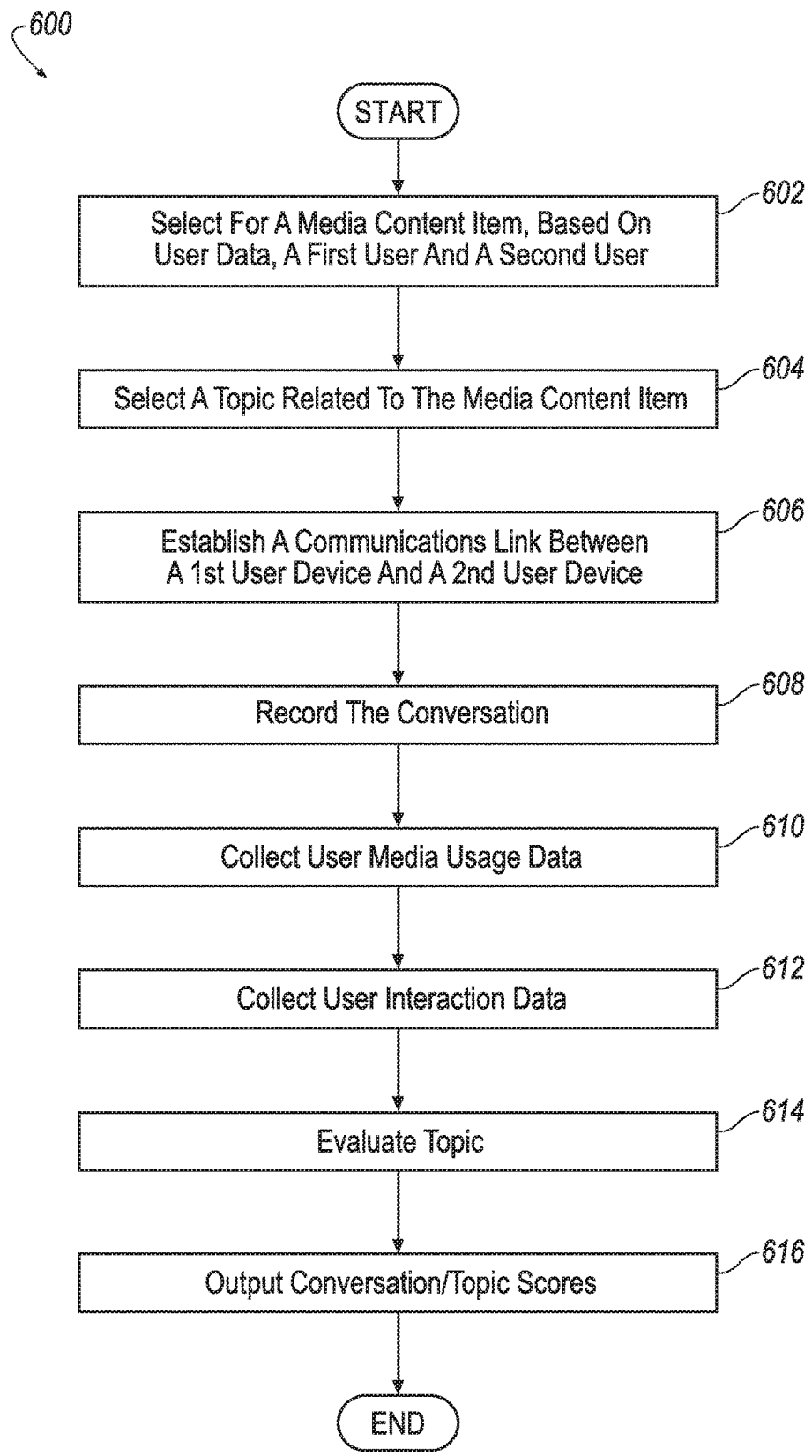
FIG. 6 is a diagram of a yet further exemplary process for initiating interactions between media content customer systems.

FIG. 6 is a diagram of an exemplary process 600 for initiating a user-user interaction based on a selected topic related to a media content item. The process 600 starts in a block 602.

In the block 602, the data server 40 selects, based on user data, a first user and a second user to participate in a conversation related to a media content item. For example, the data server 40 may, based on user usage data determine that the first user has viewed the media content item. The data server 40 may further determine that there is a strong affinity, i.e., an affinity above a specified threshold, between the first user and a second user who has not yet viewed the media content item. Additionally or alternatively, the data server 40 may determine that there is an association between the first user keywords and second user keywords or a correlation above a specified threshold between the first user keywords and second user keywords.

Upon selecting the first user and the second user to initiate a conversation based on user data, the process 600 continues in a block 604.

In a block 604, the data server 40 selects a topic as a conversation starter between the first and second users. For example, the first user, in feedback related to the media content item, may have identified the acting in the media content item as the element that the first user most appreciated. As described above, the user may have said in the feedback that the user "really liked the acting" or that "Jim Carey was outstanding". Based on these comments, the server 40 might determine that acting is a keyword indicating a characteristic of the media content item of particular interest to the user.

Further, the data server 40 may determine, based on second user keywords, or other second user data, that the second user values good acting. Based on the first and second user data, the data server 40 may select acting as a topic, and particularly acting with the media content item, for starting a conversation between the first and second user.

In some cases, the topic for starting the conversation may be chosen independently of user data. For example, a media content provider may think that a particular characteristic of a media content item is outstanding, and may wish to determine whether this characteristic is an effective topic for starting a conversation.

Upon selecting a topic for initiating a conversation between the first user and the second user, the process 600 continues in a block 606.

In the block 606 the data server 40 establishes a communication between the first user and the second user. For example, the data server 40 may output data to the first user recommending that the first user contact the second user and discuss the acting in the media content item. In order to facilitate the conversation, the data server 40 may instruct a first user device 22 associated with the first user to connect with a second user device 22 associated with the second user.

As another example, the data server 40 may establish an online connection between the first user and the second user. The data server 40 may for example send out a message to the first and second user recommending to "talk about the acting in the movie [name of media content item]" and invite the first and second user to join a chat room, or other online discussion forum. Upon initiating the communication between the first and second users, the process 600 continues in a block 608.

In the block 608, the data server 40 records the conversation. Upon recording the conversation, the process 600 continues in a block 610.

In a block 610, the data server 40 collects user media usage data with regard to the first and second user, as described with regard to the process 200. In particular, the data server 40 collects data indicating whether the second user has viewed the media content item discussed in the conversation. Upon collecting the first and second user media usage data, the process 600 continues in a block 612.

In the block 612, the data server 40 collects user data related to first user-second user interactions. The data server

40 collects data user data such as the number of conversations between the first and second users, the number of text messages exchanged, number of emails exchanged, the amount of time spent together, etc. Upon collecting the user data related to first user second user interactions, the process 612 continues in a block 614.

In the block 614, the data server 40 evaluates the topic used that the conversation starter. The data server 40 may evaluate the topic based on several different criteria.

As a first criterion, the data server 40 may evaluate the quality of the conversation. The quality of the conversation can be taken as an indication of the effectiveness of the chosen topic. The data server 40 may evaluate how long the conversation lasted, the level of positive interaction between the first and second user, voice quality data of the first and second user, etc. to determine the quality of the conversation. As described in detail above in reference to block 408 of process 400, the data server 40 may determine a score for the quality of conversation between zero and ten, with the higher score indicating a more positive experience relative to a lower score.

As a second criterion, the data server 40 may evaluate a correlation between the conversation and first and second user media usage data. In particular, the data server 40 may determine whether the second user viewed the media content item within a predefined time. Following the conversation.

As a third criterion, the data server 40 may evaluate first user-second user interactions following the conversation. The data server 40 may assign a higher score such as nine or 10 to increase interactions and a lower score such as one or two to decrease interactions.

As a fourth criterion, the data server 40 may evaluate a percentage of the conversation devoted to discussion the topic. A high percentage of the conversation devoted to the topic may indicate that the topic was an effective topic for starting the conversation, resulting in a high score. A low percentage of the conversation devoted to the topic may result in a low score. For example, in the example given above, in the case that the first and second users devoted a large portion of the conversation discussing acting in the media content item, or even acting in general, the data server 40 may assign a high score to this criterion, such as nine or ten on a ten point scale.

The data server 40 may combine the scores for the different criteria to form an overall evaluation score for the topic. Upon generating the scores for the various criteria and/or an overall score, the process 600 continues in a block 616.

In the block 616, the data server 40 outputs one or more of the scores determined in the block 614. For example, the data server 40 may output the score for the second criterion, i.e., the correlation between the conversation and second user usage data to media content providers. The score may be an indication that the topic used to start the conversation is or is not an effective topic. As another example, the data server 40 may output the overall communication score to media content providers or other users as an indication that the topic supports or does not support positive interactions between users.

Upon outputting the evaluation scores related to the conversation and/or topic, the process 600 ends.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A computing device comprising a processor and a memory, the memory including instructions such that the processor is programmed to:
   receive, first user indicia of interest for media content determined at least in part from first user data received from a first user device and second user indicia of interest for media content determined at least in part from second user data received from a second user device;
   further receive, from the first user device, first user data related to a media content item;
   monitor a conversation between the first user and the second user;
   determine a recommendation score of the media content item corresponding to the monitored conversation by evaluating recommendation data based upon data indicating (a) preferences of the first user, (b) facial expressions of the second user during the monitored conversation correlating to the media content item, and (c) feedback from users with an affinity to the first user;
   identify, based on the recommendation score, at least one indicia of recommendation of the media content item for the second user;
   update, based on the at least one indicia of recommendation, the first user indicia of interest and the second user indicia of interest;
   generate output to the first user device, based at least in part on the updated first user indicia of interest, the updated second user indicia of interest, and the first user data related to the media content items, that the first user recommend the media content item to the second user; and
   determine a feedback score of the second user for the media content item based on monitoring facial expressions of the second user when viewing the media content item.

2. The computing device of claim 1, wherein the first and second user indicia of interest include at least one of; (a) one or more numerical values indicating types of media content associated with each of the respective first and second users, (b) one or more keywords indicating characteristics or features of media content items of interest to the respective first and second users and (c) numerical ratings of one or more media content items for the respective first and second users.

3. The computing device of claim 1, wherein the first user data related to the media content item is one of; (a) a numerical rating of the media content item, (b) a video recording including comments and (c) communications from the first user related to the media content item.

4. The computing device of claim 1, wherein the processor is further programmed to:

determine a numerical value indicating a degree of relationship between the first and second users is greater than a predetermined threshold; and
generate the output to the first user to recommend the media content item to the second user based at least in part on the determination that the numerical value indicating the degree of relationship between the first and second users is greater than the predetermined threshold.

5. The computing device of claim 1, wherein the processor is further programmed to:
   calculate, prior to generating the output that the first user recommend the media content item to the second user, a numerical value indicating a degree of association between keywords of the first user and keywords of the second user; and
   generate the output to the first user to recommend the media content item to the second user based at least in part on the numerical value indicating the degree of association between the keywords of the first user and the keywords of the second user being greater than a predetermined threshold.

6. The computing device of claim 1, wherein the processor is further programmed to:
   calculate, prior to generating the output that the first user recommend the media content item to the second user, a numerical value indicating a degree of association between keywords of the first user and keywords of the second user; and
   generate the output to the first user to recommend the media content item to the second user based at least in part on the numerical value indicating the degree of association between the keywords of the first user and the keywords of the second user being less than a predetermined threshold.

7. The computing device of claim 1, wherein the processor is further programmed to:
   determine, prior to generating the output that the first user recommend the media content item to the second user, that the period of time is greater than a predetermined period of time; and
   generate the output to the first user to recommend the media content item to the second user based at least in part on determining that the period of time is greater than the predetermined period of time.

8. The computing device of claim 1, wherein the processor is further programmed to:
   establish a communications link between a first user device associated with the first user and a second user device associated with the second user.

9. The computing device of claim 1, wherein the processor is further programmed to:
   identify, based on the first user feedback, keywords associated with the media content item; and
   determine, prior to generating output to the first user to recommend the media content item to the second user, that an association of the keywords associated with the media content item by the first user with second user keywords is greater than a predetermined threshold.

10. The computing device of claim 1, wherein the processor is further programmed to:
    receive, subsequent to a conversation during which the first user recommends the media content item to the second user, data indicating that the second user viewed the media content item, and update second user indicia of interest based on the data indicating that the second user viewed the media content item.

11. A method comprising:

receiving, by a computing device, first user indicia of interest for media content determined at least in part from first user data received from a first user device and second user indicia of interest for media content determined at least in part from second data received from a second user device;

further receiving, from the first user device, first user data related to a media content item;

monitoring a conversation between the first user and the second user;

determining a recommendation score of the media content item corresponding to the monitored conversation by evaluating recommendation data based upon data indicating (a) preferences of the first user, (b) facial expressions of the second user during the monitored conversation correlating to the media content item, and (c) feedback from users with an affinity to the first user;

identifying, based on the recommendation score, at least one indicia of recommendation of the media content item of the second user;

updating, based on the at least one indicia of recommendation, the first user indicia of interest and the second user indicia of interest; and generating output to the first user device, based at least in part on the updated first user indicia of interest, the updated second user indicia of interest, and the first user data related to the media content item, that the first user recommend the media content item to the second user; and determining a feedback score of the second user for the media content item based on monitoring facial expressions of the second user when viewing the media content item.

12. The method of claim 11, wherein the first and second user indicia of interest include at least one of; (a) one or more numerical values indicating types of media content associated with each of the respective first and second users, (b) one or more keywords indicating characteristics or features of media content items of interest to the respective first and second users and (c) numerical ratings of one or more media content items for the respective first and second users.

13. The method of claim 11, wherein the first user data related to the media content item is one of; (a) a numerical rating of the media content item, (b) a video recording including comments and (c) communications from the first user related to the media content item.

14. The method of claim 11, further comprising:

determining a numerical value indicating a degree of relationship between the first and second users is greater than a predetermined threshold; and generating the output to the first user to recommend the media content item to the second user based at least in part on the determination that the numerical value indicating the degree of relationship between the first and second users is greater than the predetermined threshold.

15. The method of claim 11, further comprising:

calculating, prior to generating the output that the first user recommend the media content item to the second user, a numerical value indicating a degree of association between keywords of the first user and keywords of the second user; and generating the output to the first user to recommend the media content item to the second user based at least in part on the numerical value indicating the degree of association between the keywords of the first user and the keywords of the second user being greater than a predetermined threshold.

16. The method of claim 11, further comprising:

calculating, prior to generating the output that the first user recommend the media content item to the second user, a numerical value indicating a degree of association between keywords of the first user and keywords of the second user; and generating the output to the first user to recommend the media content item to the second user based at least in part on the numerical value indicating the degree of association between the keywords of the first user and the keywords of the second user being less than a predetermined threshold.

17. The method of claim 11, further comprising:

determining, prior to generating the output that the first user recommend the media content item to the second user, that the period of time is greater than a predetermined period of time; and generating the output to the first user to recommend the media content item to the second user based at least in part on determining that the period of time is greater than the predetermined period of time.

18. The method of claim 11, further comprising:

establishing a communications link between a first user device associated with the first user and a second user device associated with the second user.

19. The computing device of claim 1, wherein the processor is further programmed to:

determine a period of time since the first user and the second user have communicated; and generate output to the first user device, based at least in part on the period of time since the first user and the second user have communicated.

20. A computing system comprising:

one or more processors; and one or more memories storing instructions that, when executed by the one or more processors, cause the computing system to perform a process comprising:

receiving computing device, first user indicia of interest for media content determined at least in part from first user data received from a first user device and second user indicia of interest for media content determined at least in part from second data received from a second user device;

further receiving, from the first user device, first user data related to a media content item;

monitoring a conversation between the first user and the second user;

determining a recommendation score of the media content item corresponding to the monitored conversation by evaluating recommendation data based upon data indicating (a) preferences of the first user, (b) facial expressions of the second user during the monitored conversation correlating to the media content item, and (c) feedback from users with an affinity to the first user;

identifying, based on the recommendation score, at least one indicia of recommendation of the media content item of the second user;

updating, based on the at least one indicia of recommendation, the first user indicia of interest and the second user indicia of interest;

generating output to the first user device, based at least in part on the updated first user indicia of interest, the updated second user indicia of interest, and the first user data related to the media content item, that the first user recommend the media content item to the second user; and determining a feedback score of the second user for the media content item based on monitoring facial expressions of the second user when viewing the media content item.

\* \* \* \* \*

UNITED STATES PATENT AND TRADEMARK OFFICE
CERTIFICATE OF CORRECTION

PATENT NO. : 11,196,826 B2  
APPLICATION NO. : 15/389694  
DATED : December 7, 2021  
INVENTOR(S) : Nicholas Brandon Newell et al.

Page 1 of 1

It is certified that error appears in the above-identified patent and that said Letters Patent is hereby corrected as shown below:

In the Claims

Claim 11, Column 29, Line 27, after "interest;" please delete "and".

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*